US005665822A

United States Patent [19]
Bitler et al.

[11] Patent Number: 5,665,822
[45] Date of Patent: Sep. 9, 1997

[54] THERMOPLASTIC ELASTOMERS

[75] Inventors: Steven P. Bitler, Menlo Park; Ray F. Stewart, Redwood City; David A. Kamp, Sunnyvale, all of Calif.; Robert G. Freelin, McLean, Va.; Valentine Y. Yoon, Redwood City, Calif.

[73] Assignee: Landec Corporation, Menlo Park, Calif.

[21] Appl. No.: 48,280

[22] Filed: Apr. 14, 1993

Related U.S. Application Data

[63] Continuation-in-part of Ser. No. 773,047, Oct. 7, 1991, abandoned, and a continuation-in-part of Ser. No. 957,270, Oct. 6, 1992, abandoned, which is a continuation-in-part of Ser. No. 773,047, Oct. 7, 1991, abandoned.

[51] Int. Cl.$^6$ .................................................... C08L 53/00
[52] U.S. Cl. ................ 525/92 C; 525/88; 525/92 R; 525/92 F; 525/926; 525/95; 525/98; 525/92 H; 525/92 L; 525/92 A; 525/100; 525/123; 525/131; 525/166; 525/185; 525/186; 525/187; 525/227; 525/228; 525/231; 525/404; 525/411; 525/412; 525/445; 525/454; 525/455; 525/479
[58] Field of Search .............................. 525/88, 92, 100, 525/123, 166, 131, 227, 278, 185, 186, 187, 231, 404, 411, 412, 441, 454, 455, 479, 92 R, 92 C, 926, 92 H, 922, 92 A

[56] References Cited

U.S. PATENT DOCUMENTS

| 2,611,709 | 9/1952 | Plagge . | |
| 2,990,311 | 6/1961 | Shepherd | 154/95 |
| 3,157,518 | 11/1964 | Battista . | |

(List continued on next page.)

FOREIGN PATENT DOCUMENTS

| 0038392 | 4/1980 | European Pat. Off. . |
| 0 062 682 | 10/1982 | European Pat. Off. . |
| 0 107 915 | 5/1984 | European Pat. Off. . |
| 0 119 699 | 9/1984 | European Pat. Off. . |
| 0164728 | 6/1985 | European Pat. Off. . |
| 0 270 764 | 6/1988 | European Pat. Off. . |
| 0335499 | 2/1989 | European Pat. Off. . |
| 56-039014 | 4/1981 | Japan . |
| 59-003996 | 1/1984 | Japan . |
| 59-093771 | 5/1984 | Japan . |
| 63-202682 | 8/1988 | Japan . |
| 1-240589 | 9/1989 | Japan . |
| 870 022 | 6/1961 | United Kingdom . |
| 2 097 410 | 12/1984 | United Kingdom . |
| 2 223 023 | 3/1990 | United Kingdom . |
| 2 223 025 | 3/1990 | United Kingdom . |
| WO 81-00701 | 3/1981 | WIPO . |
| WO 84-03837 | 10/1984 | WIPO . |
| WO 86-05503 | 9/1986 | WIPO . |
| WO 90-13420 | 11/1990 | WIPO . |
| WO 91-14461 | 10/1991 | WIPO . |
| WO 91-14462 | 10/1991 | WIPO . |
| WO 92-13901 | 8/1992 | WIPO . |
| WO 93-07194 | 4/1993 | WIPO . |

OTHER PUBLICATIONS

Cameron et al., *Journal of Food Science* (1989) 54(6):1413–1421.

Clarke, R., Temperature Switchable Pressure Sensitive Adhesives, *Adhesives Age*, Sep. 1993, pp. 39–41.

Cohn, D. et al., Amorphous and crystalline morphologies in glycolic acid and lactic acid polymers, *Polymer*, 1987, vol. 28, Nov.

Fakirov, S., et al., "Poly(ether/ester)s Based on Poly(tetramethylene terephthalate) and Poly(ethylene glycol), 3)," *Makromol. Chem.* 191:2341–2345 (1990).

Overberger, C. G., et al., "The Preparation and Polymerization of p–Alkylstyrenes. Effect of Structure on the Transition Temperatures of the Polymers," *J. Am. Chem. Soc.*, 75:3326–3330 (1953).

Greenberg S. A., et al., "Side Chain Crystallization of n–Alkyl Polymethacrylates and Polyacrylates," *J. Am. Chem.*, 76:6280–6286 (1954).

Gogeva, T., et al., "Poly(ether/ester)s Based on Poly(tetramethylene terephthalate) and poly(ethylene glycol, 4), "*Makromol. Chem.*, 191:2355–2365 (1990).

Fakirov, S., et al. "Poly(ether/ester)s Based on Poly(butylene terephthalate) and Poly(ethylene glycol), 1," *Makromol. Chem.*, 191:603–614 (1990).

Fakirov, S., et al., "Poly(ether/ester)s Based on Poly(butylene terephthalate) and Poly(ethylene glycol, 2)" *Makromol. Chem.*, 191:615–624 (1990).

Collette, J.W., Elastomeric Polypropylenes from Alumina–Supported Tetraalkyl Group IVB Catalysts. 2. Chain Microstructure, Crystallinity, and Morphology, *Macromolecules*, 1989, 22, 3858–3866.

Deutsch, et al., Relation Between Structure of Polymers and Their Dynamic Mechanical and Electrical Properties, *Journal of Polymer Science*, Vol. XIII, pp. 565–582 (1954).

Don Mitchell, Linear Thermoplastic Polyurethane, *British Plastics*, May 1967 p. 105.

Flanagan, T., Hot–Melt Adhesives, *Handbook of Adhesive Bonding*, et C.V. Cagle (New York: McGraw–Hill, 1982) at pp. 8–1 to 8–17.

*Handbook of Pressure–Sensitive Adhesive Technology*, ed. Donatas Satas (New York: Van Nostrand Reinhold Co., Inc. 1982.

*Informational Brochure from W.R. Grace & Company*, Cryovac Division, Duncan, South Carolina 29334, 2 pages total. *J. Poly. Sci.* 60:19 (1962).

(List continued on next page.)

*Primary Examiner*—Ralph H. Dean
*Attorney, Agent, or Firm*—Jeffrey G. Sheldon; Sheldon & Mak, Inc.

[57] ABSTRACT

Thermoplastic elastomers (TPEs) containing side chain crystalline (SCC) blocks. The SCC blocks my be hard (A) blocks or the soft (B) blocks (or both) in the TPE. Some of these TPEs are novel, e.g. those in which A blocks are SCC blocks, and the B blocks are polyethers, polyacrylates, polyamides, polyurethanes or polysiloxanes. The SCC-containing TPEs are particularly useful as matrix materials for other components which are dispersed therein, e.g. energetic solids and other thermally responsive materials.

65 Claims, No Drawings

U.S. PATENT DOCUMENTS

| | | |
|---|---|---|
| 3,242,051 | 3/1966 | Hiestand et al. . |
| 3,284,423 | 11/1966 | Knapp . |
| 3,299,010 | 1/1967 | Samour . |
| 3,385,651 | 5/1968 | Rasmussen et al. . |
| 3,422,813 | 1/1969 | Braley, Jr. et al. . |
| 3,423,212 | 1/1969 | Purcell et al. . |
| 3,450,543 | 6/1969 | Badran et al. . |
| 3,507,667 | 4/1970 | Magnen . |
| 3,535,295 | 10/1970 | Davis et al. . |
| 3,583,845 | 6/1971 | Pulone . |
| 3,635,754 | 1/1972 | Beede . |
| 3,644,252 | 2/1972 | Shenfeld et al. . |
| 3,681,092 | 8/1972 | Titchenal et al. . |
| 3,690,937 | 9/1972 | Guss et al. . |
| 3,706,410 | 12/1972 | Baker . |
| 3,838,079 | 9/1974 | Kosaka et al. . |
| 3,922,464 | 11/1975 | Silver et al. . |
| 3,935,338 | 1/1976 | Robertson . |
| 3,949,750 | 4/1976 | Freeman . |
| 3,956,223 | 5/1976 | Chiang et al. . |
| 3,967,045 | 6/1976 | Kurobe et al. . |
| 3,975,323 | 8/1976 | Georgoudis et al. . |
| 4,015,033 | 3/1977 | Nizza . |
| 4,033,918 | 7/1977 | Hauber . |
| 4,039,705 | 8/1977 | Douek et al. . |
| 4,079,152 | 3/1978 | Bedrosian . |
| 4,082,705 | 4/1978 | Beede et al. . |
| 4,086,388 | 4/1978 | Brown . |
| 4,123,589 | 10/1978 | Korlatzki et al. . |
| 4,136,203 | 1/1979 | Murphy et al. . |
| 4,139,675 | 2/1979 | Nagai et al. ............ 428/349 |
| 4,140,115 | 2/1979 | Schonfeld ............ 128/156 |
| 4,141,487 | 2/1979 | Faust et al. ............ 229/43 |
| 4,143,858 | 3/1979 | Schmidt, III et al. ............ 526/48.2 |
| 4,151,319 | 4/1979 | Sackoff et al. ............ 428/401 |
| 4,152,189 | 5/1979 | Guerrin et al. . |
| 4,156,434 | 5/1979 | Parker et al. ............ 137/13 |
| 4,186,258 | 1/1980 | Schmidt, III et al. ............ 525/342 |
| 4,276,340 | 6/1981 | de Leiris ............ 428/166 |
| 4,299,719 | 11/1981 | Aoki et al. ............ 252/188 |
| 4,322,465 | 3/1982 | Webster ............ 423/194 |
| 4,335,026 | 6/1982 | Balinth ............ 524/271 |
| 4,338,227 | 7/1982 | Ballard ............ 524/143 |
| 4,356,222 | 10/1982 | Harawaka ............ 428/78 |
| 4,361,450 | 11/1982 | Munson . |
| 4,361,526 | 11/1982 | Allen . |
| 4,363,872 | 12/1982 | Ealding ............ 430/532 |
| 4,400,486 | 8/1983 | Iwata et al. ............ 525/57 |
| 4,414,053 | 11/1983 | Karim et al. . |
| 4,460,371 | 7/1984 | Abber et al. ............ 428/40 |
| 4,483,978 | 11/1984 | Manser . |
| 4,485,133 | 11/1984 | Ohsuka et al. ............ 428/38 |
| 4,487,872 | 12/1984 | Takemoto ............ 524/127 |
| 4,509,504 | 4/1985 | Brundin ............ 128/112 |
| 4,512,329 | 4/1985 | Sweet . |
| 4,530,440 | 7/1985 | Leong ............ 220/261 |
| 4,536,409 | 8/1985 | Farrel et al. ............ 426/308 |
| 4,557,964 | 12/1985 | Magnotta ............ 428/187 |
| 4,565,010 | 1/1986 | Coughlan ............ 228/186 |
| 4,640,838 | 2/1987 | Isakson et al. ............ 426/107 |
| 4,657,610 | 4/1987 | Komatsu et al. . |
| 4,693,776 | 9/1987 | Krampe et al. . |
| 4,728,572 | 3/1988 | Davis . |
| 4,732,808 | 3/1988 | Krampe et al. . |
| 4,737,389 | 4/1988 | Hartsing et al. . |
| 4,737,410 | 4/1988 | Kanter . |
| 4,759,444 | 7/1988 | Barmore . |
| 4,762,888 | 8/1988 | Sun et al. . |
| 4,764,586 | 8/1988 | Manser et al. . |
| 4,778,852 | 10/1988 | Futamura . |
| 4,783,342 | 11/1988 | Polovina . |
| 4,783,354 | 11/1988 | Fagan . |
| 4,806,613 | 2/1989 | Wardle . |
| 4,830,855 | 5/1989 | Stewart . |
| 4,830,863 | 5/1989 | Jones . |
| 4,835,199 | 5/1989 | Futamura et al. ............ 524/66 |
| 4,842,875 | 6/1989 | Anderson . |
| 4,847,175 | 7/1989 | Pavlisko et al. ............ 430/58 |
| 4,856,650 | 8/1989 | Inoue . |
| 4,879,178 | 11/1989 | Sun et al. . |
| 4,919,737 | 4/1990 | Biddle et al. . |
| 4,923,703 | 5/1990 | Antoon, Jr. . |
| 4,925,908 | 5/1990 | Bernard . |
| 4,949,847 | 8/1990 | Nagaia . |
| 4,952,644 | 8/1990 | Wardle et al. . |
| 4,956,209 | 9/1990 | Isaka et al. . |
| 4,959,048 | 9/1990 | Seder et al. . |
| 4,959,516 | 9/1990 | Tighe et al. . |
| 4,960,600 | 10/1990 | Kester et al. ............ 426/310 |
| 4,973,615 | 11/1990 | Futamura et al. ............ 524/66 |
| 4,976,794 | 12/1990 | Biddle et al. . |
| 5,000,162 | 3/1991 | Shimek et al. ............ 126/512 |
| 5,011,698 | 4/1991 | Antoon, Jr. et al. ............ 426/355 |
| 5,052,370 | 10/1991 | Karabin ............ 428/187 |
| 5,065,751 | 11/1991 | Wolf ............ 128/331 |
| 5,069,200 | 12/1991 | Thow et al. . |
| 5,100,963 | 3/1992 | Lin . |
| 5,120,349 | 6/1992 | Stewart et al. . |
| 5,129,180 | 7/1992 | Stewart . |
| 5,156,911 | 10/1992 | Stewart . |
| 5,254,354 | 10/1993 | Stewart . |
| 5,290,585 | 3/1994 | Elton . |
| 5,290,845 | 3/1994 | Berg et al. . |
| 5,290,853 | 3/1994 | Regan et al. . |
| 5,290,886 | 3/1994 | Ellul . |
| 5,290,893 | 3/1994 | Hori et al. . |
| 5,290,898 | 3/1994 | Doi et al. . |
| 5,412,035 | 5/1995 | Schmitt et al. ............ 525/93 |
| 5,469,867 | 11/1995 | Schmitt ............ 128/898 |

OTHER PUBLICATIONS

Jordan et al., *J. Polymer Sci.* 9:3349–365 (1971).

Jordan et al., *J. Polymer Sci*: Part A–2 (1972) 10:1657–1679.

Jordan, Jr., E.F., *Viscosity Index. 1. Evaluation of Selected Copolymers Incorporating n–Octadecyl Acrylate as Viscosity Index Improvers*, J. of Poly. Sci., vol. 22, 1509–1528 (1978).

Kamper, et al., Water Vapor Permeability of an Edible Fatty Acid, Bilayer Film, *J. Food Sci.*, 49(6), 1482–85.

Landrock, A.H, *Adhesive Technology Handbook*, (Park Ridge, New Jersey: Noyes Publications, 1985), pp. 154–156.

Lenz, Robert W., *Organic Chemistry of Synthetic High Polymers*, John Wiley & Sons, N.Y. (1967) pp. 49–49.

Lin, Y.G. et al., Effect of shear stress on viscoelastic properties of a phase–separated ultiblock thermoplastic elastomer, *Polymer*, 1989, vol. 30, May.

Lioutas, T. S., *Food Technology* (Sep. 1988), pp. 78–86.

McMullin, *California–Arizona Farm Press* (Saturday, Apr. 20, 1991) pp. 25.

Mosby, C.V., *Body Temperature Regulation*, Medical Physiology, 11th Ed. Edited by Philip Bard (1961).

Roff, W.J. et al., *Handbook of Common Polymers*, Butterworth & Co. (Publishers) Ltd, 1971.

Sogah, D.Y. et al., Group Transfer Polymerization. Polymerization of Acrylic Monomers, *Macromolecules*, 1987, 20, 1473–1488.

Sorenson, W.R., *Preparative Methods of Polymer Chemistry*, Interscience Publishers, Second Edition (1968).

*SPI Plastics Engineering Handbook of the Society of the Plastics Industry, Inc.*, 5th ed. (1991).

Temin, S.C., *Encyclopedia of Polymer Science and Engineering*, Vol. 13 (New York, John Wijley & Son, 1988), pp. 345–368.

*The Wiley Encyclopedia of Packaging Technology*, John Wiley and Sons, 1986, p. 48, 53, 531–536.

Zagory, et al., *Modified Atmosphere Packaging of Fresh Produce*, Food Technology, Sep. 1988, pp. 70–77.

Pittman, A. G., et al., "Effect of Polymer Crystallinity on the Wetting Properties of Certain Fluoroalkyl Acrylates," *J. Poly Sci.*, Part A-1, 7:3053–3066 (1969).

Jordan, Jr., E. F., et al., "Side–Chain Crystallinity. Heats of Fusion and Melting Transitions on Selected Copolymers Incorporating n–Octadecyl Acrylate or Vinyl Stearate" *J. Poly Sci.*, Part A-1, 9:3349–3365 (1971).

Jordan, Jr., E. F., et al., "Side–Chain Crystallinity. Influence of Side–Chain Crystallinity on the Glass Transition Temperatures of Selected Copolymers . . . ," *J. Poly Sci.*, Part A-1 9:3367–3378 (1971).

Wada, T., et al., "Effect of Amount of Medium on the Radiation–induced Polymerization of Ethylene in tert–Butyl Alcohol," *J. Poly Sci.*, Part A-1, 10:1655–1667 (1972).

Jordan, Jr., E. F., "Side–Chain Crystallinity. Heats of Fusion and Melting Temperatures on Monomers whose Homopolymers Have Long Side Chains," *J. Poly Sci.*, Poly. Chem. Ed. 10:3347–3366 (1972).

Jordan, Jr., E. F., "Side–Chain Crystallinity. Heats of Fusion and Melting Transitions on Selected Homopolymers Having Long Side Chains," *Polymer Journal*, 9:1835–1852 (1971)**.

González de la Campa, J. I., et al., "Side–Chain Crystallinity, Heat of Melting, and Thermal Transitions in Poly [N–(10–n–Alkyloxycarbonyl–n–Decyl)Maleimides] (PEMI)," *J. Poly Sci.*, Poly. Phys. Ed., 18:2197–2207 (1980).

Chupov, et al., "Structure and Physico–chemical Properties of Comb–like Polypeptides Based on Poly–L–Lysine," *Polymer Science U.S.S.R.* 21:241–252 (1979).

Platé, N. A., et al., "Comb–like Polymers. Structures and Properties." *J. Polymer Sci.: Macromolecular Reviews* 8:117–253 (1974).

Kallitsis, J. K. et al., "Compatibility of Poly(ether ester) Block Copolymers with Chlorinated Polyethylene," *Polymer*, 29:1233–1239 (1988).

Khan, I. M., et al., "ABA Triblock Comb Copolymers with Oligo(oxyethylene) Side Chains as Matrix for Ion Transport," *Makromol. Chem.*, 190:1069–1078 (1989).

Aharoni, S. M., "Rigid Backbone Polymers. Polyisocyanates and their Liquid–crystal Behavior," *Macromolecules*, 12:94–103 (1979).

Magagnini, P. L., et al., "Studies on Comb–like Polymers, Poly(octadecylethylene)" *Macromolecules*, 13:12–15 (1980).

Andruzzi, F., et al., "Studies on Comb–like Polymers, Poly(octadecylethylene oxide)," *Macromolecules*, 13:15–18 (1980).

Miyamoto, M., et al., "Synthesis of Telechelic Living Poly(vinyl ethers)," *Macromolecules*, 18(2):123–127 (1985) (erroneously cited as 18:213).

Watanabe, J., et al., "Thermotropic Polypeptides. Molecular Packing and Thermotropic Behavior of Poly(L–glutamates) with Long n–Alkyl Side Chains," *Macromolecules*, 18:2141–2148 (1985).

Rabolt, J. F., et al., "Studies of Chain Conformational Kinetics in Poly(di–n–alkylsilanes) by Spectroscopic Methods, Poly(di–n–hexIlsilane), Poly(di–n–heptylsilane), . . . ," *Macromolecules*, 19:611–616 (1986).

Chow, T. S., "Miscible Blends and Block Copolymers, Crystallization, Melting, and Interaction," *Macromolecules* 23:333–337 (1990).

Murphy, E. A., et al. "Characterization of Poly(3, 3–Bisethoxymethyl Oxetane) and Poly(3,3–Bisazidomethyl Oxetane) and their Block Copolymers," *J. App. Poly. Sci.*, 37(1):267–281 (1989).

Miyauchi, et al. "A New Composite Resistor with PTC Anomaly.," *J. Polymer Sci.:* Polymer Chem. Ed., 19:1871–1873 (1981).

Talukder M. A. H., et al., "Synthesis and the Preliminary Analysis of Block Copolymers of 3,3'–Bis (azidomethyl)–Oxetane . . . ," *J. Poly Sci.*, Part A, Poly. Chem. 28(9):2393–2401 (1990).

Yokota, K., et al., "Widely–spaced Comb–like Polymers Having Fluoroalkyl Side Chains," *Polymer Journal*, 17(9):991–996 (1985).

PCT International Search Report, dated 22 Jan. 1993 for PCT/US92/08508.

THERMOPLASTIC ELASTOMERS

CROSS-REFERENCE TO RELATED APPLICATIONS

This application is a continuation-in-part of
(1) Ser. No. 07/773,047 filed Oct. 7, 1991, by Bitler, Stewart, Kamp and Freelin (now abandoned), and
(2) Ser. No. 07/957,270 filed Oct. 6, 1992, by Bitler, Stewart, Kamp, Freelin and Yoon (now abandoned), which is a continuation-in-part of Ser. No. 07/773,047 filed Oct. 7, 1991, abandoned and is related to
(3) Ser. No. 07/654,723 fled Feb. 12, 1991, by Schmitt and Tsugita, (now abandoned);
(4) Ser. No. 07/829,494 filed Feb. 7, 1992, by Schmitt and Tsugita, (now abandoned), as a continuation-in-part of Ser. No. 07/654,723 (now abandoned);
(5) Ser. No. 07/928,800 filed Aug. 12, 1992, by Schmitt, Tsugita, Clark, Bitler, Larson and Schultz (now abandoned), as a continuation-in-part of Ser. No. 07/829, 494, (now abandoned)
(6) Ser. No. 07/885,915, filed May 18, 1992, by Stewart (now U.S. Pat. No. 5,254,354) as a continuation of Ser. No. 07/623,602 filed Dec. 9, 1990 by Stewart (now abandoned) and
(7) Ser. No. 07/939,110 filed Sep. 2, 1992 by Schmitt (now U.S. Pat. No. 5,469,867).

The disclosure of each of the patents referred to above is incorporated herein by reference for all purposes.

GOVERNMENT SUPPORT

The U.S. Government may have certain rights to this invention pursuant to U.S. Air Force Contract No. FO8635-90-C-0350.

BACKGROUND OF THE INVENTION

1. Field of the Invention

This invention relates to thermoplastic elastomers.

2. Introduction to the Invention

Thermoplastic elastomers, which are often referred to as TPE's, are well known. The TPE's in general use contain (i) polymeric blocks (usually referred to as "hard" blocks or A blocks) which (a) are amorphous and have a second order transition point, $T_{gh}$, which is well above room temperature, or (b) have a crystalline polymer backbone and have a crystalline melting point, $T_{mh}$, which is well above room temperature, and (ii) amorphous polymeric blocks (usually referred to as "soft" blocks or B blocks) which have a glass transition point, $T_{gs}$, which is well below room temperature. Each soft block is linked to at least two hard blocks, so that at temperatures between $T_{gs}$ and $T_{mh}$, or $T_{gs}$ and $T_{gh}$, the amorphous B blocks are tied together, resulting in elastomeric behavior. Above $T_{mh}$ or $T_{gh}$, melting or softening of the hard blocks permits viscous flow of the polymeric chains, resulting in thermoplastic behavior. Known TPE's are described for example in U.S. Pat. Nos. 4,260,659 (Gobran), 4,361,526 (Allen), 4,483,978 (Manser), 4,551,388 (Schlademan), 4,554,324 (Husman), 4,656,213 (Schladman), 4,764,586 (Manser), 4,778,852 (Futamura), 4,806,613 (Wardle), 4,919,737 (Biddle et al.), 4,952,644 (Wardle et al.), and 4,976,794 (Biddle et al.) and in the articles in Polymer, 29 (7), 1233–1239 (1988) Kallitsis et al.; J. Appl. Poly. Sci 37 (1), 267–281 (1989) Murphy et al.; J. Poly. Sci, Part A, Poly Chem, 28 (9) 2393–2401 (1990) Talukder et al.; Makromol Chem, 190, 1069–1078 (1989) Khan et al., 191, 603–614, 615–624, and 2341–2354 (1990) Fakirov et al., and 191 2355–2365 (1990) Gogeva; and Macromolecules 18 (2), 123–127 (1985) Miyamoto et al., and 23,333–337 (1990) Chow. The disclosure of each of those patents and articles is incorporated herein by reference.

It has also been proposed in the patent literature to use, as components in temperature-sensitive dispensers for pesticides, disinfectants, drugs and other active agents, block copolymers containing a side chain crystallizable (SCC) polymer and a second polymer which exhibits a glass transition or melting point higher than the SCC polymer, such that the entire mass exhibits mechanical stability above the melting point of the SCC polymer but below the transition of the second polymer. See U.S. Pat. No. 4,830,855 (Stewart), the disclosure of which is incorporated herein by reference. The block copolymer undergoes a rapid change in permeability to the active agent in the region of the melting point of the SCC polymer, and the second polymer ensures that the SCC polymer remains immobilized even if its melting point is reached or exceeded.

SUMMARY OF THE INVENTION

This invention relates to TPE's which comprise A blocks, or B blocks, is or both A blocks and B blocks, which are crystalline and in which at least a part of the crystallinity results from the presence of crystallizable side chains. Such crystalline blocks are referred to herein as SCC blocks. TPE's containing SCC A blocks are novel and as such form part of the present invention. The invention also includes processes, compositions, shaped articles and assemblies which make use of TPE's containing SCC A blocks. TPE's containing SCC B blocks and non-SCC A blocks are not novel as a class, but this invention includes a wide range of novel processes, compositions, shaped articles and assemblies which make use of such TPE's.

TPE's Containing SCC A Blocks

TPE's containing SCC A blocks have the advantage that they can exhibit a much more rapid change in viscosity in the region of the crystalline melting point of the side chains in the TPE (referred to herein as $T_q$) than is exhibited by known TPE's in the region of $T_{mh}$ or $T_{gh}$. This rapid change in viscosity results in a number of important advantages. One advantage is that the novel TPE's can be melt processed at temperatures not far above $T_q$, e.g. below about $(T_q+10)°$ C., whereas known TPE's are typically melt processed at temperatures at least 40° C. above $T_{mh}$ or $T_{gh}$. Known TPE's are typically melt processed at temperatures above 100° C., whereas the preferred TPE's of the invention can be melt processed at temperatures below 100° C., for example below 75° C. and even below 50° C. This is particularly useful when the TPE is preferably or necessarily maintained at a temperature below a critical limit (referred to herein as $T_{crit}$). Such conditions arise for example when the TPE is associated with (e.g. is contained within, surrounds, forms a layer on, or is mixed with) a thermally responsive substance which may undergo, at a temperature above $T_{crit}$, a change which is undesirable during such processing. The substance may be for example in the form of (i) solid particles dispersed within the TPE, e.g. particles of an explosive solid, or a pharmaceutical or agricultural chemical, or (ii) a substrate which is contacted by the TPE, e.g. a vessel in a living animal into which the TPE has been injected or otherwise placed, or (iii) a solid or a liquid which is encapsulated by the TPE. Another advantage is that the novel TPE's can be used as carriers (including encapsulants) for substances which are at least partially protected by the TPE at temperatures substantially below and approaching $T_q$. The protection may be against physical attack and/or against chemical attack. The hard blocks in the TPE will begin to melt at a temperature $T_o$ which is somewhat below $T_q$, e.g. 3°–12° C. below $T_q$. As the temperature is increased from $T_o$ to $T_q$, there is a rapid change in the protection provided by the TPE, and above $T_q$ the substance may be released entirely from the TPE. For example, a mixture of the TPE and an agricultural chemical can be applied during a cold season of the year while the ambient temperature is below $T_q$ and the chemical will be released when the ambient temperature exceeds $T_q$. Similarly a seed can be coated with a TPE and will not germinate until the ambient temperature approaches or exceeds $T_q$.

Another very important advantage of the novel TPE's containing SCC A blocks is that the value of $T_q$ can be closely controlled through selection of the crystallizable moieties in the side chains. Thus, for a given crystallizable moiety, $T_q$ is mainly dependent on the length of the crystallizable moiety, and changes by at most a few °C., e.g. less than 5° C., with changes in the molecular weight of the A block. In the known TPE's, by contrast, $T_{mh}$ or $T_{gh}$ changes substantially with changes in the molecular weight of the A block, because the melting point is dependent on folding of the main chain. In the TPE's containing SCC A blocks, it is possible to change the physical properties of the TPE, e.g. the elongation, modulus and tensile strength, without substantially changing $T_q$, by changing the molecular weight of the TPE and/or the molecular weight of the A blocks and/or the relative mounts of the A and B blocks.

The TPE's containing SCC A blocks also show a relatively small difference between $T_q$ (the endotherm melt peak on a DSC curve as the TPE is heated) and the crystallization peak on a DSC curve as the molten TPE is cooled.

Another very important advantage of the novel TPE's containing SCC hard (A) blocks is that the presence of the SCC A blocks results in improved shear strength. Furthermore their shear strength can be yet further improved by incorporation therein of a relatively low molecular weight and low melting crystalline additive, particularly an SCC polymer. The crystalline additive must be intimately mixed with the TPE, preferably through a melt mixing process or a process which comprises mixing the TPE and the additive in a common solvent. Particularly good results are obtained when the SCC blocks in the TPE and in the additive are structurally similar, and it appears that the improved shear strength results from co-crystallization of the additive and the SCC blocks. Thus a preferred combination is a TPE containing SCC blocks comprising polyethylene or poly (substituted methylene) groups and an SCC additive comprising polymethylene or poly (substituted methylene) groups. Suitable crystalline additives include those disclosed in the Schmitt et al. Application No. 07/928,800, U.S. Pat. No. 5,412,035, incorporated by reference herein.

The advantages noted above make the novel TPE's with SCC hard blocks, and mixtures thereof with crystalline additives, particularly suitable for us as pressure-sensitive adhesive (PSA's) and as hot melt adhesives. The TPE, or mixture thereof with a crystalline additive, can be the sole polymeric ingredient(s) of the adhesive, or can be mixed with other polymeric ingredients. For example, a conventional PSA can be modified by addition of the TPE or mixture of TPE and additive. The adhesive preferably contains 25 to 100%, particularly 75 to 100% of the TPE, and 0 to 50%, preferably 1 to 40%, of the additive. PSA's for use in the medical field for attachment to human skin preferably contain 20 to 35% of the additive. PSA's for use in other fields preferably contain less than 15%, e.g. 1 to 5%, of the additive. The adhesive can also contain additives such as tackifiers, plasticizers, fillers, stabilizers and pigments. PSA's which contain the crystalline additive have the valuable property that they have reduced adhesive strength when heated to temperatures approaching or above the crystalline melting point of the additive, as discussed in Schmitt et al. Application No. 07/928,800, U.S. Pat. No. 5,412,035.

The novel TPE's containing SCC hard blocks can also contain SCC soft blocks. We have found that such TPE's, in addition to the advantages noted above for TPE's containing SCC hard blocks, are particularly useful in the form of films and other shaped articles which are heat-sealed to other polymeric articles. The TPE will undergo a rapid change in its physical properties, including its permeability to at least some gases and vapors, e.g. $O_2$, $CO_2$ and water vapor, in the region of $T_{ms}$, but will retain substantial strength until heated to a temperature in the region of $T_q$, when it will again undergo a rapid change in its physical properties, including its heat sealability. The repeating units of the different SCC blocks can be selected to provide a change in permeability (or other property) over a desired temperature range, and to provide a hard block which, above $T_{mh}$, will be compatible with the other polymeric material to which the TPE is to be heat sealed. In this way, it is possible to make a TPE which is sufficiently flexible at 0° C., which undergoes a marked change in permeability in the range of 0° C. to 40° C., which retains adequate physical strength at temperatures up to $T_q$ (or close to it) and which can be melt extruded and heat sealed at temperatures not far above $T_q$, e.g. 60° to 100° C. If desired, the physical strength of the TPE can be improved by crosslinking, but this is not generally necessary. Such a TPE can be particularly useful as a packaging material, e.g. for actively respiring biological material, as disclosed in the Stewart Application No. 885,915 incorporated by reference herein.

TPE's Containing SCC B Blocks and Non-SCC A Blocks

We have found that SCC soft (B) blocks can confer important and previously unrealized benefits on TPE's containing them, making it possible to use such TPE's in ways which are novel and surprisingly valuable, even when the A blocks are not SCC blocks and the TPE is in itself known for use in other ways. For example, such TPE's can be used to provide pressure-sensitive adhesives (PSA's) with very valuable properties, to provide films and other shaped articles which can be heat-sealed to other articles, and to provide hot melt adhesives.

Summary of Various Aspects of the Invention

First Aspect—Novel TPE

In a first aspect, this invention provides novel TPE's containing SCC hard (A) blocks. These novel TPE's preferably comprise polymeric molecules which comprise (i) polymeric A blocks which
  (a) are crystalline and have a melting point $T_q$, and
  (b) wherein at least one of the A blocks comprises a side chain comprising crystallizable moieties which render the block crystalline; and (ii) at least one polymeric B block which is linked to at least two A blocks and which
  (a) is crystalline and has a melting point $T_{ms}$ which is less than $(T_q-10)°$ C., or
  (b) is amorphous and has a glass transition point $T_{gs}$ which is less than $(T_q-10)°$ C.

Second Aspect—Processes for Preparing the Novel TPE's

Any process can be employed to make the novel TPE's of the present invention. However, particularly useful processes, which provide the second aspect of the present invention, comprise I. reacting together
(i) an A block precursor which is the A block containing at least one reactive group J, and
(ii) a B block precursor which is the B block containing at least two reactive groups K, which may be the same or different, which will react with the reactive group J to form a link which is part of the polymer backbone, the molar ratio of (i) to (ii) being at least 2, thus making a TPE of the ABA, $A_nB$ or $(AB)_n$ type; or II. reacting together
(i) a B block precursor which is the B block containing at least two reactive groups L, which may be the same or different, and
(ii) (a) a monomeric component comprising at least one monomer which will react with the group L and with itself or with a reactive group resulting from reaction of the monomeric component with the B block precursor, optionally with the aid of an initiator, to form the A block, or
(b) an A block precursor which is the A block containing at least one reactive group M which will react with the group L to form the A block; or III. reacting together
(i) an A block precursor which is the A block terminated by a reactive group N, and
(ii) a monomeric component comprising at least one monomer which will react with the group N and with itself to form the B block with at least two A blocks pendant from the polymeric backbone of the soft block;
or IV. performing a living polymerization in which the monomers for the A and B blocks are polymerized separately and sequentially, using an initiator so that the growing polymer chain has a terminal group which reacts with the monomer present at that time and in turn produces a reactive terminal group on the residue of the monomer which has reacted with the growing polymer chain.

In all of these reactions, other ingredients may be present in order to modify the properties of the product, for example initiators, chain transfer agents and monomers which may be chemically or physically incorporated into the resulting TPE.

Third Aspect—Compositions, Shaped Articles and Assemblies Comprising the Novel TPE In a third aspect, this invention provides a composition, shaped article or assembly which comprises a novel TPE as defined above and a second component which is mixed with the TPE, or which is surrounded (e.g. encapsulated) by the TPE, or which contacts (e.g. surrounds or otherwise provides a substrate for) the TPE.

In one embodiment, this aspect of the invention is particularly valuable when the second component is a thermally responsive substance which undergoes a thermally induced change at a temperature $T_{crit}$ which is above the temperature at which the TPE can conveniently be melt processed. Because the novel TPE's can be melt-processed at temperatures close to $T_q$, generally below $(T_q+60)°$ C., often below $(T_q+40)°$ C., and even lower, they are superior to conventional TPE's which are usually melt processed at temperatures well above their melting point. $T_{crit}$ is preferably above $(T_q+10)°$ C., e.g. $(T_q+10)°$ C. to $(T_q+40)°$ C. or $(T_q+60)°$ C.

In another embodiment, this aspect of the invention is particularly valuable when the second component is intimately mixed with the TPE and is a crystalline polymeric additive, preferably an SCC polymer, which (a) has a first order transition point $T_a$ in the composition of 23° to 120° C., preferably 30° to 60° C., and
(b) has a heat of fusion of at least 5 Joules/g, preferably at least 20 Joules/g.

The presence of the crystalline additive can substantially improve the shear value of the composition. This is particularly useful when the composition is to be used as a PSA, for which purpose the composition may also contain an amorphous polymer, e.g. a conventional PSA, as well as other conventional ingredients of PSA's.

Fourth Aspect—Making Shaped Articles of the Third Aspect of the Invention

In a fourth aspect, this invention provides a process for making a shaped article, which process comprises
(A) melting a novel TPE as defined above,
(B) dispersing an additive in the molten TPE,
(C) shaping the dispersion from step B, and
(D) cooling the shaped article from step C to a temperature below $T_q$.

Fifth Aspect—Releasing Second Components from Compositions, Shaped Articles and Assemblies of the Third Aspect of the Invention In a fifth aspect, this invention provides a process for releasing the second component from a composition, shaped article or assembly of the third aspect of the invention, which process comprises heating the composition, article or assembly by means of heat which is (i) generated by a mammalian body or (ii) generated artifically, e.g. by an electrical or other heater or by an engine or electrical motor, and/or (iii) conveyed artifically to the TPE. The heat may be conveyed to the TPE by convection, conduction or radiation, but is preferably conveyed by means of a stream of heated fluid, e.g. heated air or a body fluid, which also assists in removal of the second component from the TPE.

Sixth Aspect—PSA's and PSA Composites Comprising TPE's Containing SCC Blocks, and Methods of Using Them In a sixth aspect, this invention provides a composition which is suitable for use as (or in the production of) a pressure-sensitive adhesive (PSA) and which comprises a TPE in which the A blocks, or the B blocks, or both, are SCC blocks. Particularly useful PSA compositions comprise a mixture of the TPE with (a) a crystalline polymer additive, preferably a side chain crystallizable (SCC) polymer, and/or (b) with an amorphous polymer (which may be an elastomer), e.g. a known PSA. In this aspect, the invention includes also PSA composites comprising a backing having a coating thereon of such a composition, particularly PSA-coated articles for use in the medical field, for example an assembly which comprises
(i) a flexible backing,
(ii) a solvent-free layer of a pressure-sensitive adhesive (PSA) which is secured to the backing, and which comprises a TPE or is at least partially covered by a layer comprising a TPE, said TPE comprising polymeric molecules which comprise
 (i) polymeric A blocks which
  (a) are crystalline and have a melting point $T_q$, or
  (b) are amorphous and have a glass transition point $T_{gh}$;
 (ii) at least one polymeric B block which is linked to at least two A blocks and which
  (a) is crystalline and has a melting point $T_{ms}$ which is less than $(T_q-10)°$ C. or less than $(T_{gh}-10)°$ C. or
  (b) is amorphous and has a glass transition point $T_{gs}$ which is less than $(T_q-10)°$ C. or less than $(T_{gh}-10)°$ C.

wherein at least one block selected from the A and B blocks comprises a side chain comprising crystallizable moieties which render the block crystalline. This aspect of the invention also includes processes for preparing assemblies by joining articles together using such a composition; and processes for disassembling such assemblies which include heating the PSA to weaken it. These PSA's, PSA composites, assemblies, and processes preferably have the functional characteristics set out in the Schmitt et al. applications incorporated by reference herein, which also discloses amorphous base resins, crystalline polymer additives, methods of formulating PSA's, methods of applying PSA's to backings, backings, and methods of using PSA composites, which are generally suitable for use in this aspect of the invention.

Seventh Aspect—Heat-Sealed Assemblies Comprising Articles Comprising TPE's Containing SCC Blocks In a seventh aspect, this invention provides a film or other article which comprises a TPE in which the A blocks, or the B blocks, or both, are SCC blocks, particularly an article which is suitable for use as a component of a food package and/or in a method which requires heat-sealing the film. These films preferably have the functional characteristics set out in Stewart Ser. No. 07/885,915 now U.S. Pat. No. 5,254,654 incorporated by reference herein, which also discloses food packages, and methods of packaging and storing foodstuffs, suitable for use in this aspect of the invention. One assembly according to this aspect of the invention comprises (1) a first film which comprises a TPE comprising polymeric molecules which comprise
(i) polymeric A blocks which
  (a) are crystalline and have a melting point $T_q$, or
  (b) are amorphous and have a glass transition point $T_{gh}$;
(ii) at least one polymeric B block which is linked to at least two A blocks and which
  (a) is crystalline and has a melting point $T_{ms}$ which is less than $(T_q-10)°$ C. or less than $(T_{gh}-10)°$ C. or
  (b) is amorphous and has a glass transition point $T_{gs}$ which is less than $(T_q-10)°$ C. or less than $(T_{gh}-10)°$ C.
wherein at least one block selected from the A and B blocks comprises a side chain comprising crystallizable moieties which render the block crystalline, and (2) a second film which is heat-sealed to the first film and which is composed of a polymeric composition which is compatible with the A block or the B block or both.

Eighth Aspect—Hot Melt Adhesives Comprising TPE's Containing SCC Blocks

In an eighth aspect, this invention provides a hot melt adhesive comprising a TPE in which the A blocks, or the B blocks, or both, are SCC blocks and processes for joining two articles together which comprise forming a layer of a molten polymeric composition containing such a TPE between the articles, pushing the articles together, and allowing the composition to cool. Preferably the composition comprises a TPE comprising polymeric molecules which comprise
(i) polymeric A blocks which
  (a) are crystalline and have a melting point $T_q$, or
  (b) are amorphous and have a glass transition point $T_{gh}$; and
(ii) at least one polymeric B block which is linked to at least two A blocks and which
  (a) is crystalline and has a melting point $T_{ms}$ which is less than $(T_q-10)°$ C. or less than $(T_{gh}-10)°$ C. or
  (b) is amorphous and has a glass transition point $T_{gs}$ which is less than $(T_q-10)°$ C. or less than $(T_{gh}-10)°$ C.
wherein at least one block selected from the A and B blocks comprises a side chain comprising crystallizable moieties which render the block crystalline; and at least one of the articles to be joined is composed of a polymeric material which is compatible with the A block or the B block or both.

DETAILED DESCRIPTION OF THE INVENTION

For clarity and convenience, the following detailed description of the invention is divided into various headings and sub-headings, e.g. by lo reference to the various different aspects of the invention. It is to be understood, however, that where a particular feature is discussed only under one heading, e.g. in relation to one aspect of the invention, that feature is applicable to the invention generally, and can for example be used in other aspects of the invention.

DEFINITIONS, ABBREVIATIONS AND MEASUREMENTS

In this specification, unless otherwise stated, parts, amounts and percentages are by weight. Temperatures are in ° C. Molecular weights are in Daltons and are determined by gel permeation chromatography (GPC) in THF (tetrahydrofuran) against a polystyrene standard, the $M_n$ values being number average molecular weights and the $M_w$ values being weight average molecular weights. In some places, $M_w$ values are given in thousands, abbreviated as "k"; thus an $M_w$ given as 65k means that the weight average molecular weight is 65,000 Daltons. First order transition points (often referred to as melting points), glass transition points, and heats of fusion are determined by a differential scanning calorimeter (DSC), using the second heat cycle and a heating rate of 10° C./minute. The peak of the DSC curve is $T_q$ when the measurement is carried out on the TPE, and $T_m$ when the measurement is carried out on the hard block precursor before it is incorporated into the TPE. Glass transition points are taken at the mid-point (first derivative) of the secondary transition. Elongation (El) and tensile strength (TS) values are measured at 25° C. using a tensile test instrument, for example an Instron tensile tester, at a crosshead speed of 0.5 inch/minute (1.27 cm/minute). Modulus values are Young's Modulus (YM) values measured in the same way as the elongation values. Viscosity values are measured at 25° C. and a solids content of 30% (we used a Brookfield Viscometer Model LVT) and expressed in centipoise. Complex viscosity and complex modulus values are measured at a rate of 0.05 radians/second, unless otherwise specified (we used a Rheometrics cone-and-plate mechanical spectrometer). The recrystallization time (XL time) is measured by a procedure in which (a) a steel plate having on its top surface a layer 10 microns thick of the TPE is heated to 60° C., (b) the plate is placed on a cooling surface maintained at 25° C., and (c) a glass rod, 0.2 cm in diameter, is dipped into the TPE at frequent intervals; the recrystallization time is the time elapsed between placing the plate on the cooling surface and the time when it is no longer possible to draw a fine string of TPE from the plate with the glass rod.

The term Cn is used herein to denote a linear compound or group containing n carbon atoms, and the abbreviations CnA (or Cn Acrylate), CnMA and CnIEMA are used to denote linear alkyl acrylates, linear alkyl methacrylates, and linear alkyl oxycarbonylamido-ethylmethacrylates in which the alkyl group contain n carbon atoms. For example, C4A is butyl acrylate, C16A is hexadecyl acrylate, and C22MA is docosanyl (also known as behenyl) methacrylate. The abbreviations EHA, HEA, MBA and AA are used for 2-ethylhexyl acrylate, 2-hydroxyethyl acrylate, 3-methoxybutyl acrylate, and acrylic acid, respectively. The abbreviation AIBN is used for azo bis-isobutyronitrile. The abbreviation IEMA is used for isocyanatoethylmethacrylate.

Shear and Tack Values are measured by Test Procedures PSTC-7 and PSTC-6, respectively, of the Pressure-Sensitive Tape Council. In the Shear Test, a sample of the PSA composite 0.5 inch (1.25 cm) square is pressed against a vertical steel plate, and after 5 minutes, a 1000 g weight is secured to the backing; the shear value is the time in seconds before the backing falls off the plate. In the Tack Test, a ball bearing 7/16 inch (1.1 cm) in diameter is allowed to roll down a standard incline onto the PSA surface of the composite; the tack value is the distance in cms that the ball runs over the PSA.

Peel Strengths for PSA composites applied to human skin are measured as follows. After removing the release sheet (if any), two identical samples are placed on the underside of the forearm of an adult, with the length of the strips parallel to the arm bone. Light hand pressure is applied to the entire surface of the strips. After about 0.5 hour, 1 hour, 24 hours, or 48 hours, one end of one strip is detached from the skin and attached to a clip which is attached by a wire to the load cell of an Instron Materials Testing Instrument (IMTI) or an equivalent instrument. The sample is then removed by peeling it off at a rate of 10 inch (25.4 cm) per minute, the sample being bent back over itself at an angle of about 180°. The other strip is removed in the same way, except that a hair dryer is used to warm the entire strip to a temperature of about 40° C. before it is peeled off. The average peel strength for each strip is recorded at room temperature (LT) and at the higher temperature (HT).

Moisture Vapor Transmission Rates (MVTR) are measured by ASTM E96-60, using the desicant method, at 37° C. and a humidity difference of about 70%, and are expressed in g/mil/m²/24 hr.

SCC BLOCKS

The crystallizable moieties in the side chains of the SCC blocks are preferably such that a DSC scan of the TPE shows a very sharp melting point which results from melting of the crystallizable moieties, for example a difference between the onset of melting ($T_o$) and the peak ($T_q$ or $T_{ms}$) on a DSC curve of less than 10° C., preferably less than 8° C., particularly less than 6° C., especially less than 4° C. The melting point of the SCC block on its own, i.e. of the block precursor or of an equivalent polymer, which is referred to herein as $T_m$, is closely related to $T_q$ (in a hard block) or $T_{ms}$ (in a soft block). $T_q$ or $T_{ms}$ will generally be between ($T_m$-10)° C. and ($T_m$+5)° C., usually between ($T_m$-5)° C. and $T_m$. $T_q$ and/or $T_{ms}$ are selected according to the intended use of the TPE and are generally 0° to 200° C., preferably less than 150° C., particularly less than 85° C. In the SCC blocks, preferably 50 to 100%, particularly 70 to 100%, especially 90 to 100%, of the repeating units contain crystallizable side chains. The crystallizable side chains may be the same or different. The heat of fusion of the SCC block on its own is generally at least 5 or at least 10, preferably at least 20, particularly at least 40, for example 60 to 120, Joules/g. The heat of fusion of the SCC block in the TPE will depend upon the heat of fusion of the SCC block on its own and upon the weight proportion of the SCC block in the TPE. Thus if the TPE contain p% of an SCC block, the heat of fusion of that SCC block in the TPE will generally be about 0.01 p times the heat of fusion of the SCC block on its own, or less.

Known SCC's which can form SCC blocks in the TPE's used in this invention include polymers of one or more monomers such as substituted and unsubstituted acrylates, fluoroacrylates, vinyl esters, acrylamides, maleimides, α-olefins, p-alkyl styrenes, alkylvinyl ethers, alkylethylene oxides, alkyl phosphazenes and amino acids; polyisocyanates; polyurethanes; polysilanes; polysiloxanes; and polyethers; all of such polymers containing long chain crystallizable groups. Suitable SCC's are described for example in J. Poly. Sci. 60, 19 (1962), J. Poly. Sci, (Polymer Chemistry) 7, 3053 (1969), 9, 1835, 3349, 3351, 3367, 10, 1657, 3347, 18, 2197; 19, 1871, J. Poly. Sci, Poly-Physics Ed 18 2197 (1980), J. Poly. Sci, Macromol. Rev, 8, 117 (1974), Macromolecules 12, 94 (1979), 13, 12, 15, 18, 2141, 19, 611, JACS 75, 3326 (1953), 76; 6280, Polymer J 17, 991 (1985); and Poly. Sci USSR 21, 241 (1979).

The SCC blocks in the TPE's used in this invention can be broadly defined as polymer blocks which comprise repeating units of the general formula

where Y is an organic radical forming part of the polymer backbone and Cy comprises a crystallizable moiety. The crystallizable moiety may be connected to the polymer backbone directly or through a divalent organic or inorganic radical, e.g. an ester, carbonyl, amide, hydrocarbon (for example phenylene), amino, or ether link, or through an ionic salt linkage (for example a carboxyalkyl ammonium, sulfonium or phosphonim ion pair). The radical Cy may be aliphatic or aromatic, for example alkyl of at least 10 carbons, fluoralkyl of at least 6 carbons or p-alkyl styrene wherein the alkyl contains 6 to 24 carbons. The SCC block may contain two or more different repeating units of this general formula. The SCC may also contain other repeating units, but the amount of such other units is preferably such that the total weight of the crystallizable moieties is at least twice the weight of the remainder of the block.

Preferred SCC blocks comprise side chains containing in total at least 5 times as many carbon atoms as the backbone of the block, particularly side chains comprising linear polymethylene moieties containing 12 to 50, especially 14 to 22, carbon atoms, or linear perfluorinated or substantially perfluorinated polyethylene moieties containing 6 to 50 carbon atoms. Blocks containing such side chains can be prepared by polymerizing one or more corresponding linear aliphatic acrylates or methacrylates, or equivalent monomers such as acrylamides or methacrylomides. A number of such monomers are available commercially, either as individual monomers or as mixtures of identified monomers, for example C12A, C14A, C18A, C22A, a mixture of C18A, C20A and C22A, a mixture of C26A to C40A, fluorinated C8A (AE800 from American Hoechst) and a mixture of fluorinated C8A, C10A and C12A (AE12 from American Hoechst). The blocks can optionally also contain units derived from one or more other comonomers preferably selected from other alkyl, hydroxyalkyl and alkoxyalkyl acrylates, methacrylates (e.g. glycidal methacrylate), acrylamides and methacrylamides; acrylic and methacrylic acids; acrylamide; methacrylamide; maleic anhydride; and comonomers containing amine groups. Such other co-monomers are generally present in total amount less than 50%, particularly less than 35%, especially less than 25%, e.g. 0 to 15%. They may be added to modify the melting point or other physical properties of the TPE. The melting point of a block containing such polymethylene side chains is influenced by the number of carbon atoms in the crystallizable side chains. For example, homopolymers of C14A, C16A, C18A, C20A, C22A, C30A, C40A and C50A respectively typically have melting points of 20, 36, 49, 60, 71, 76, 96 and 102° C., while the homopolymers of the corresponding n-alkyl methacrylates typically have melting points of 10°, 26°, 39°, 50°, 62°, 68°, 91° and 95° C. Copolymers of such monomers generally have intermediate melting points. Copolymers with other monomers, e.g. acrylic acid or butyl acrylate, typically have somewhat lower melting points.

Other polymers which can be used for precursors of SCC blocks in TPE's used in this invention, or which can be formed by a living polymerization on another preformed block, include atactic and isotactic polymers of n-alkyl α-olefins (e.g. the atactic and isotactic polymers of $C_{16}$ olefin, having $T_m$'s of 30° and 60° C. respectively); polymers of n-alkylglycidyl ethers (e.g. the polymer of $C_{18}$ alkyl glycidylether); polymers of n-alkyl vinyl ethers (e.g. the polymer of $C_{18}$ alkylvinylether having a $T_m$ of 55° C.); polymers of n-alkyl-α-epoxides (e.g. the polymer of the $C_{18}$ alkyl α-epoxide having a $T_m$ of 60° C.); polymers of n-alkyl oxycarbonylamido-ethylmethacrylates (e.g. the polymers of C18 IEMA, C22 IEMA and C30 IEMA having $T_m$'s of 56°, 75° and 79° respectively); polymers of n-fluoro alkyl acrylates (e.g. the polymers of $C_8$ hexadecafluoroalkylacrylate, and of a mixture of $C_{8-12}$ alkyl fluoroacrylates having Tm's of 74° and 88° C. respectively), polymers of n-alkyloxazolines (e.g. the polymer of $C_{16}$ alkyl oxazoline having a $T_m$ of 155° C.); polymers obtained by reacting an hydroxyalkyl acrylate or methacrylate with an alkyl isocyanate (e.g. the polymers obtained by reacting hydroxyethyl acrylate with $C_{18}$ or $C_{22}$ alkyl isocyanate and having $T_m$'s of 78° and 85° respectively); and polymers obtained by reacting a difunctional isocyanate, a hydroxyalkyl acrylate or methacrylate, and a primary fatty alcohol (e.g. the polymers obtained by reacting hexamethylene diisocyanate, 2-hydroxyethyl acrylate, and $C_{18}$ or $C_{22}$ alcohols, and having $T_m$'s of 103° and 106° C. respectively).

Preferred SCC blocks in the TPE's used in this invention comprise 60 to 100% of units derived from at least one monomer selected from the group consisting of alkyl acrylates, alkyl methacrylates, N-alkyl acrylamides, N-alkyl methacrylamides, alkyl oxazolines, alkyl vinyl ethers, alkyl vinyl esters, α-olefins, alkyl 1,2-epoxides and alkyl glycidyl ethers in which the alkyl groups are n-alkyl groups containing 14 to 50 carbon atoms, and the corresponding fluoroalkyl monomers in which the alkyl groups are n-alkyl groups containing 6 to 50 carbon atoms; 0 to 20% of units derived from at least one monomer selected from the group consisting of alkyl acrylates, alkyl methacrylates, N-alkyl acrylamides, alkyl vinyl ethers, and alkyl vinyl esters in which the alkyl groups are n-alkyl groups containing 4 to 12 carbon atoms; and 0 to 15% of units derived from at least one polar monomer selected from the group consisting of acrylic acid, methacrylic acid, itaconic acid, acrylamide, methacrylamide, acrylonitrile, methacrylonitrile, vinyl acetate and N vinyl pyrrolidone. Such SCC block polymers may also contain units derived from other monomers to change compatibility with other blocks, or to raise the modulus of the TPE; such monomers include styrene, vinyl acetate, monoacrylic functional polystyrene and the like.

The number average molecular weight of the SCC block is preferably less than 200,000, more preferably less than 100,000, particularly less than 50,000, more particularly 2,000 to 20,000, especially 3,000 to 20,000.

A particular advantage of the present invention is that the molecular weight of the SCC block can be adjusted (for example through choice of the reaction conditions and addition of chain transfer agents) so as to optimize the mechanical properties of the TPE without substantial change in $T_q$ or $T_{ms}$.

SCC HARD (A) BLOCKS

When a TPE used in this invention includes hard SCC blocks, preferably all the hard blocks in the TPE are SCC blocks. The hard SCC blocks are preferably all of the same type, with each block being derived from the same monomer or mixture of monomers. When two different SCC hard blocks are present, the TPE may have two or more distinct $T_q$'s, corresponding to the different SCC blocks. When conventional hard blocks are also present, they preferably do not amount to more than 10%, particularly not more than 5%, of the TPE. Such other hard blocks, if present, can be of any kind, including those disclosed in the documents incorporated by reference herein.

As indicated above, $T_q$ will be selected according to the intended use of the TPE. When the TPE is used in a human or other animal, $T_q$ is selected so that the TPE is solid at normal temperatures but molten at an elevated temperature which can be tolerated by the animal. For such use, $T_q$ is preferably 30° to 50° C., particularly 34° to 45° C., more particularly 37° to 44° C., e.g. 40° to 44° C. when the TPE is to be used in humans. When the TPE is associated with an explosive propellant, or other energetic material, $T_q$ is preferably 60° to 110° C., particularly 75° to 105° C. When the TPE is associated with a pharmaceutical, $T_q$ is generally 10° to 80° C., preferably 25° to 50° C.

NON-SCC SOFT (B) BLOCKS

The non-SCC soft (B) blocks in the novel TPE's of the invention can be of any kind, including those disclosed in the documents incorporated by reference herein. The TPE can contain one or more different types of non-SCC B blocks. The glass transition point ($T_{gs}$) or melting point ($T_{ms}$) of the B blocks should be below ($T_q$-10)° C., preferably less than ($T_q$-20)° C., particularly less than ($T_q$-40)° C. $T_{gs}$ or $T_{ms}$ should also be below the temperature at which the TPE should exhibit elastomeric properties in use, for example less than 20° C., preferably less than 0° C., particularly less than -20° C., e.g. less than -40° C.

When the TPE contains more than one non-SCC B block, the B blocks will usually be the same; however, the TPE can contain two or more different B blocks. A B block can contain a single repeating unit (which may be derived from a single monomer or a pair of monomers) or two or more different repeating units. When there are two or more different repeating units in a B block, they can be distributed randomly or in blocks.

Examples of suitable amorphous B blocks are polyethers (containing, for example, between the ether linkages, an aliphatic, aromatic or mixed aliphatic aromatic group, and derived for example from tetrahydrofuran); polyacrylates (this term being used to include polymers of at least one alkyl acrylate, methacrylate, acrylamide or methacrylamide, optionally with other copolymerizable monomers such as acrylic acid, methacrylic acid, acrylamide, methacrylamide, acrylonitrile, acrolein, vinyl esters and styrene); polyesters (derived for example from a dihydroxy compound and a dicarboxylic acid or derivative thereof such as an acid chloride or ester); polyamides (derived for example from a lactone or from a diamine and a dicarboxylic acid or derivative thereof such as an acid chloride); polyurethanes (derived for example from a diisocyanate and a dihydroxy compound or a diamine); and polysiloxanes.

The linkages between repeating units in a B block can be the same as, or different from, the linkages between repeating units in the SCC A blocks. The linkages between the B block(s) and the A blocks can be the same as, or different from, the linkages between repeating units in the B block(s). They can for example be the residue of a linking compound which contains at least two reactive groups which will react with groups on the A and B blocks, for example a diisocyanate such as methylene diphenylene diisocyanate, tolylene diisocyanate, or hexamethylene diisocyanate.

The number average molecular weight of the B blocks is generally more than 5,000 and less than 900,000, preferably less than 500,000, particularly less than 200,000, especially less than 100,000, e.g. 10,000 to 80,000.

SCC SOFT (B) BLOCKS

When a TPE used in this invention includes soft SCC blocks, preferably all the soft blocks in the TPE are SCC blocks. The soft SCC blocks are preferably all of the same type, with each block being derived from the same monomer or mixture of monomers. When two different SCC soft blocks are present, the TPE may have two or more distinct $T_{ms}$'s, corresponding to the different SCC blocks. When conventional soft blocks are also present, they preferably do not amount to more than 10%, particularly not more than 5%, of the TPE. Such other soft blocks, if present, can be of any kind, including those disclosed in the documents incorporated by reference herein.

As indicated above, $T_{ms}$ will be selected according to the intended use of the TPE. Thus $T_{ms}$ can be selected so that the TPE changes, over a predetermined and relatively narrow temperature range including $T_{ms}$, between a relatively hard and inflexible material and an elastomeric material. For most uses, $T_{ms}$ is preferably less than 60° C., particularly less than 45° C., especially less than 30° C. $T_{ms}$ is also preferably more than 0° C., particularly more than 5° C. For example, $T_{ms}$ may be 3° to 40° C., preferably 5° to 20° C. In one preferred embodiment, the B block is a polyacrylate, preferably a polyacrylate which contains 50 to 100%, preferably 80 to 100%, of units derived from at least one n-alkyl acrylate or methacrylate in which the alkyl group contains 4 to 16, particularly 12 to 14, carbon atoms or from an equivalent monomer, e.g. an acrylamide or methacrylamide. Such B blocks may for example include units derived from one or more other ethylenically unsaturated comonomers including AA, EHA, HEA, MBA and methacrylic acid.

NON-SCC HARD (A) BLOCKS

When a TPE used in this invention includes non-SCC hard (A) blocks, the detailed description given above for non-SCC soft (B) blocks is equally applicable, subject only to the limitation that the melting point ($T_{mh}$) or glass transition point ($T_{gh}$) of the block must be higher, rather than lower, than the melting point of the SCC block ($T_{ms}$). Thus $T_{ms}$ should be below $(T_{mh}-10)°$ C. or $(T_{gh}-10)°$ C., preferably below $(T_{mh}-20)°$ C. or $(T_{gh}-20)°$ C., particularly below $(T_{mh}-40)°$ C. or $(T_{gh}-40)°$ C.

NOVEL TPE's CONTAINING SCC HARD (A) BLOCKS

So that the novel TPE can show elastomeric properties, each soft (B) block must be linked to at least two SCC A blocks having a $T_q$ higher than the $T_{gs}$ or $T_{ms}$ of the B block. The A blocks are insoluble in the B block(s) when the TPE is solid, and therefore anchor the B block(s) at temperatures below $T_q$, thus providing elastomeric properties below $T_q$ and above $T_{gs}$, in a similar fashion as the A blocks in known TPE's. However the crystallizable side chains in the novel A blocks apparently plasticize the TPE at temperatures above $T_q$ and thus assist in the very rapid reduction in viscosity at temperatures just above $T_q$. The greater the compatibility of the A and B blocks above $T_q$, the larger the reduction in viscosity. The complex viscosity of the TPE preferably decreases from a first value $Q_1$ dynes/cm² to a second value $Q_2$ dynes/cm², where $Q_2$ is less than $Q_1 \times 10^{-3}$, preferably less than $Q_1 \times 10^{-5}$, as the temperature increases from $T_1$ to $T_2$, where $T_1$ is less than $T_q$, e.g. $(T_q-3)°$ C., $(T_q-5)°$ C. or $(T_q-10)°$ C. and $T_2$ is at most $(T_q+10)°$ C., e.g. $(T_q+7)°$ C. or $(T_q+4)°$ C. The TPE exhibits a corresponding decrease in complex modulus over the same temperature range.

When the soft block is crystalline, preferably $T_q$ is 40° to 125° C. and $T_{ms}$ is 3° to 40° C. In one preferred TPE, the B block comprises 50 to 100%, preferably 75 to 100%, by weight of units derivable from at least one n-alkyl acrylate or methacrylate in which the n-alkyl group contains 4 to 16 carbon atoms, preferably C12A or C14A or both, and the A block comprises 50 to 100%, preferably 75 to 100% by weight of units derivable from at least one n-alkyl acrylate or methacrylate in which the n-alkyl group contains at least 18 carbon atoms, preferably 18–30 carbon atoms, particularly from C22A.

The novel TPE's generally have an ABA (triblock), $(AB)_n$, or $A_nB$ structure where n is at least 2, though mixtures of such structures can be used. The $A_nB$ structure includes the various different types of graft copolymer which can be prepared. The novel TPE's will generally contain 2 to 90% of the SCC hard blocks. TPE's to be used in PSA's preferably contain 2 to 15%, particularly 3 to 10%, of the SCC hard blocks. TPE's for other uses can contain for example 10 to 90%, preferably 10 to 70%, particularly 25 to 60%, of the SCC hard blocks. The crystallizable moieties in the SCC hard blocks may provide less than 65%, particularly less than 60%, of the TPE.

The TPE's can be prepared by preparing separate precursor polymers corresponding to the A and B blocks, and then reacting the precursors, if necessary after functionalizing one or both of the precursors. For example an A block precursor containing at least one hydroxyl or amino group (e.g. a polymer prepared by polymerizing acrylic monomers and a capping agent or by polymerizing an alkyl epoxide or oxazoline) can be reacted with a B block precursor containing two or more isocyanate or acid chloride groups.

The TPE's can also be prepared by preparing a precursor polymer corresponding to the B block, and then polymerizing the monomer (or monomers) for the A block on the precursor, if necessary after functionalizing both ends of the precursor. For example, a B block precursor can be difunctionalized with mercapto groups, and the A blocks can then be prepared by adding an acrylic monomer and initiator to the difunctionalized precursor.

In another method, purified monomers are added to a reaction medium containing a suitable initiator in the order in which they are desired to add onto a living, growing polymer chain. For example a living cationic polymerization can be carried out by adding an SCC hard block monomer, followed by a soft block monomer, and either a hard block monomer to terminate the polymer chain or a series of hard and soft block monomers to prepare a block copolymer of desired composition. Such a method can make use of an $HI/I_2$ initiator system of the kind disclosed in Macromolecules 18 213 (1985).

The TPE's can also be prepared by preparing a precursor polymer corresponding to the A block, preferably an SCC acrylate or methacrylate polymer, and having a terminal unit which is copolymerizable with the monomer(s) for the soft block and then polymerizing the monomer(s) for the sot block, preferably an alkyl acrylate or methacrylate under conditions such that at least two A block precursor molecules are incorporated in the backbone of each polymer chain formed by the soft block monomer(s). For example an SCC acrylate polymer can be prepared, capped with mercapto ethanol, functionalized by reaction with isocyanatoethylmethacrylate, methacryloyl isocyanate, acryloyl chloride or methacryloyl chloride, and then reacted with butyl acrylate and/or a similar low molecular weight acrylate. The proportions of the reactants and the presence of a chain transfer agent can be used to control the ratio of soft blocks to hard blocks.

The TPE's used in this invention generally exhibit elongations of 5 to 500%, e.g. 50 to 500%. Their modulus is generally 10 to 100,000 psi (0.7 to 7,000 kg/cm$^2$), e.g. 10 to 50,000 psi (0.7 to 3500 kg/cm$^2$). The higher the proportion of hard blocks, the higher the modulus. The TPE's generally contain less than 90%, preferably less than 70%, and more than 2% of the hard blocks.

When a TPE containing crystalline A blocks is cooled from a temperature above $T_q$ to a temperature substantially below $T_q$, it does not recrystallize as soon as the temperature $T_q$ is reached. There is a delay before recrystallization takes place. The recrystallization time (XL time) measured as described above is a measure of that delay, though it should be pointed out that the time to recrystallization is generally reduced as $T_q$ increases above the measurement temperature. The length of the delay which is preferred varies from application to application. For example if the molten TPE (alone or with additives) is being introduced (e.g. extruded or injected) into a mold or channel, too short a recrystallization time may cause the TPE to solidify before it has filled the mold and/or in the apparatus used to introduce it, especially if a fine needle is used to inject the molton TPE. On the other hand, too long a recrystallization time may result in at least some of the molten TPE running out, or being washed out, of the channel or mold before it has solidified. One of the advantages of this invention is that by appropriate changes in the repeating units of the SCC hard block, and/or the ratio of hard blocks to soft blocks, the recrystallization time can be changed in a controllable way. The TPE's, when used to occlude a channel in a living mammal, preferably have recrystallization times of 5 to 150 seconds, preferably 10 to 97 seconds, particularly 10 to 73 seconds.

The number average molecular weight ($M_n$) of the TPE's used in this invention is generally 5,000 to 800,000, preferably 10,000 to 800,000, for example 5,000 to 400,000, particularly 10,000 to 200,000. The ratio $M_w/M_n$ is generally from 1 to 15, e.g. 2 to 4.

COMPOSITIONS, SHAPED ARTICLES, AND ASSEMBLIES

In the compositions, shaped articles, and assemblies of the invention, a TPE containing SCC hard blocks is associated with a second component which contacts the TPE. The term "associated with" is used herein in a broad sense to include compositions in which the second component is a solid which is distributed, preferably uniformly, throughout the TPE; shaped articles in which the TPE surrounds, preferably encapsulates, the second component, which may be in the form of small particles; and assemblies in which the TPE is supported, e.g. at least partially surrounded, by the second component. The amount of the TPE in the composition is generally at least 10%, preferably at least 15%, and may be more, e.g. at least 20%, based on the weight of the TPE and the second component. The A block preferably has a solubility constant which ensures that second component is effectively wetted by the TPE in the molten state.

The invention is particularly useful when it is desired to make a solid composite containing a second component which is a thermally responsive material and which must be maintained below a relatively low critical temperature ($T_{crit}$) at least for storage purposes. Thus conventional TPE's are often unsatisfactory for this purpose because the thermally responsive material has a $T_{crit}$ which is below the temperature at which the conventional TPE can conveniently be melt-processed. The novel TPE's, by contrast, can be melt-processed at much lower temperatures, and furthermore can be tailored to have a $T_q$ appropriate to any value within a wide range of values for $T_{crit}$. The value of $T_{crit}$ can be set by reaction (including decomposition) of the second component.

Second components can be dispersed in the TPE by adding them slowly to the TPE while it is molten and at a temperature safely below $T_{crit}$. The solid product obtained by shaping the molten composition (e.g. by extrusion or in a mold), followed by cooling, is mechanically tough and can absorb impact energy, thus reducing the danger of accidental explosion or the like. The product can also absorb thermal energy because significant heat will be absorbed in melting the hard blocks of the TPE. Furthermore, the product can be easily reheated and reprocessed if desired.

When the second component is dispersed in the TPE by melt mixing, and the amount of the additive is relatively high, e.g. greater than 50%, the composition may also contain a plasticizer to lower melt viscosity during the dispersion process. The plasticizer must be compatible with the TPE, but is preferably not compatible with the hard block so that its presence does not change the melting behavior of the TPE.

Particularly important active additives are the so-called "energetic" materials, including fuels, explosives, including low vulnerability explosives, rocket and gun propellants, munitions of all kinds, decoy flares, gas and smoke generators, and the various materials which may be mixed with them, including oxidizers, stabilizers, cure rate modifiers, burn rate modifiers, and plasticizers. Particular energetic materials are disclosed in U.S. Pat. Nos. 4,361,450 (Munson), 4,361,526 (Allen), 4,483,978 (Manser), 4,919, 737 (Biddle et al.) and 4,976,796 (Biddle et al.), the disclosures of which are incorporated herein by reference. Current methods for making composites containing energetic materials make use of crosslinked elastomeric binders, which require complex heating schedules and which yield products which cannot be reprocessed.

Other thermally responsive second components include pharmacologically or biologically active materials (e.g. blood-coagulating compounds, spermcides, hormones, growth regulators and antibiotics), agricultural chemicals, seeds, catalysts and enzymes.

Other second components can provide the solid composition with desired properties such as toughness, elongation, thermal conductivity, opacity to radiation, e.g. X-rays, and good moisture vapor transmission. Such components include for example reinforcing fillers, including fibers, gold powder, silver powder, radio-opaque pigments, fumed silica, and hydrophilic materials such as carboxymethyl cellulose, guar gum, carragenan and cellulosic fibers.

The novel compositions, shaped articles and assemblies can be used to expose or release a second component which is distributed in or encapsulated by the TPE, especially in response to an increase in temperature from below $T_q$ to above $T_q$. Second components which can thus be exposed or released include herbicides, seeds, perfumes, deodorizers, pest control agents, fungicides, insecticides, fertilizers and other agrichemicals, disinfectants, and pharmaceuticals. Thus specific applications include coating formulations to control water transmission to seeds, animal ear tags, collars and harnesses to release pest control agents, and microcapsules to release agrichemicals in response to temperature changes.

Another important use for certain of the novel TPE's is to occlude a channel in a mammal, and like uses, as disclosed in the Schmitt application No. 939,100 incorporated herein by reference.

Other applications include he production of pharmaceutical and medical products in a form which is satisfactory for ingestion, implantation, skin attachment or the like, which can be readily processed at selected temperatures well below the degradation temperature of the product, and which is sufficiently elastomeric to prevent brittle fracture and flaking.

Other specific applications include flexible commercial products like shoe soles, clothing, weather stripping, gasketing, sealants, caulking, expansion joints, roofing membranes, cable insulation, and the like. The novel TPE's can have $T_q$'s which are above the maximum temperatures to which such products are exposed in use, but which allow the TPE to be processed at lower temperatures than the TPE's currently used for such applications. They an therefore be processed more economically. For example TPE shoe soles a currently processed at 100° C. and through use of the new TPE's could be processed at 70° C.

The invention is illustrated in the following Examples.

EXAMPLES

In Examples 1–6, the ingredients and amounts thereof (in grams) shown in Table 1 were reacted to form a TPE of the invention having the properties shown in Table 1. In Table 1, POLY-THF 650, POLY-THF 2000 and POLY-THF 4500 are polyethers of different molecular weights which are obtained by polymerizing tetrahydrofuran and which are commercially available from BASF. In Examples 1–4, the hard blocks were formed by polymerization of an acrylate monomer on a polyurethane elastomer obtained by reaction of POLY-THF with a diisocyanate. In Examples 5 and 6, a preformed hard block polymer was functionalized by reaction with a diisocyanate and then reacted with POLY-THF.

In Examples 7 to 31 and 33–46, the first step was to make a hard block SCC acrylate and/or methacrylate polymer, using the ingredients and mounts thereof (in grams) shown in Table 2 to make one of the SCC polymers H1 to H19 having the properties shown in Table 2. The SCC polymer was then functionalized by reaction with isocyanatoethylmethacrylate (IEMA).

In Examples 7 to 31, the TPE was then prepared by copolymerizing butyl acrylate and the functionalized hard block polymer, using the amounts shown in Table 3, to give a TPE having the properties shown in Table 3. In Examples 33–49, the TPE was prepared by copolymerizing the ingredients and amounts thereof shown in Table 4, to give a TPE having the properties shown in Table 4.

Further details of the procedures in the Examples are given below.

EXAMPLE 1

The POLY-THF 650, toluene (500 mL) and dibutyl tin dilaurate (1 drop) were added to a 1-liter flask equipped with a stirrer, a Dean-Stark water separator and a drying tube. The toluene was distilled from the flask into the separator to remove water. After cooling, the diisocyanate was injected into the reaction mixture, which was then stirred at room temperature for 22 hours; the reaction was monitored by infra-red (IR) spectroscopy, observing the isocyanate peak at 2270 cm$^{-1}$. The amine was then added as a solution in about 10 mL of warm toluene. After the reaction mixture had been at room temperature for 24 hours, the acrylate monomer and AIBN (present as an initiator) were added, and nitrogen was bubbled through the mixture for 8 minutes. The reaction mixture was heated to 60° C. for 18 hours, with stirring. After cooling, the mixture was poured into 1 liter of heptane, and the TPE was recovered as a precipitate.

EXAMPLE 2

The POL-THF 650 and toluene (70 mL) were added to a 100 mL flask fitted with a stirrer and a Dean-Stark water separator, and 25 mL of toluene were distilled from the flask into the water separator under nitrogen to remove water. The mixture was cooled and the separator was replaced with a serum cap and a drying tube. The diisocyanate and one drop of dibutyl tin dilaurate were added, and the reaction mixture was stirred at room temperature for 21 hours. $T_o$ the resulting solution was added the amine (as a solution in 5 mL of warm toluene). The solution was stirred at room temperature for 2.5 hours, at which time no isocyanate could be is detected by IR spectroscopy. The solution was transferred to a screw-capped bottle fitted with a stirrer, and the acrylate and AIBN were added. The bottle was sealed and then heated to 60° C. for 18 hours with stirring. After cooling, the mixture was poured into heptane, and the TPE was recovered as a precipitate which was dried under vacuum at room temperature.

EXAMPLE 3

The procedure of Example 2 was followed, with the following modifications: (1) 35 mL of toluene were added instead of 70 mL; (2) after addition of the diisocyanate, the mixture was stirred for 23.5 hours, instead of 21 hours; (3) toluene (30 mL) was added to the viscous solution which was then heated to 60° C. before adding the amine; (4) the amine-containing solution was stirred for 48 hours, instead of 2.5 hours, at room so temperature; and (5) the mixture was poured into ethyl alcohol, instead of heptane, to recover the TPE.

EXAMPLE 4

The procedure of Example 2 was followed, with the following modifications: (1) 55 mL of toluene were added, instead of 70 mL; (2) after addition of the diisocyanate, the mixture was stirred for 4 hours at 40° C., instead of 21 hours at room temperature; and (3) after addition of the amine to the viscous solution at 40° C., the mixture was heated for 2 hours at 40° C. instead of 2.5 hours at room temperature.

EXAMPLE 5

The poly (1,2-octadecene epoxide), M$_n$ 2579, and toluene (100 mL) were placed in 500 mL flask fitted with a stirrer, a Dean-Stark water separator and a nitrogen inlet. 25 mL of the toluene were distilled into the separator to remove water. The separator was then replaced by a stopper. The diisocyanate, dissolved in 8 mL of toluene, and one drop of dibutyl tin dilaurate were added. The mixture was heated to 75° C. with stirring for 2 hours 40 minutes, after which time no change could be detected by IR spectroscopy. A solution of the POLY-THF in 100 mL toluene was dried by distilling 25 mL of the toluene into a water separator, and the dried solution was added to the 75° C. solution of the isocyanate-modified hard block polymer. The reaction mixture was maintained at 75° C. for 0.5 hour, and after cooling was poured into heptane. The TPE was recovered as a precipitate which was dried under vacuum at room temperature.

EXAMPLE 6

The procedure of Example 5 was followed with the following modifications: (1) the poly(1,2-octadecene epoxide), $M_n$ 2261 instead of 2579, was placed in the flask with 105 mL, instead of 100 mL, of toluene; (2) the diisocyanate was dissolved in 10 mL, instead of 8 mL, of toluene; (3) the mixture was heated to 70° C. for 1 hour, instead of 75° C. for 2 hours 40 minutes; (4) 85 mL, instead of 100 mL, of toluene was used in preparing the solution of POLY-THF; (5) the reaction mixture was maintained at 70° C. for 2 hours, instead of 75° C. for 0.5 hour; and (6) the cooled reaction mixture was poured into ethanol, instead of heptane, to recover the TPE.

EXAMPLES 7–45

Preparation of Hard Block SCC Polymers H1 to H19

SCC polymer H1 was prepared by adding the docosanyl acrylate (100 g), mercaptoethanol (3.6 g) as capping agent, and AIBN (1 g) as initiator, to toluene (200 mL), and heating the reaction mixture with reflux under nitrogen at 60° C. for 16 hours with stirring. The SCC polymer was isolated and heated with IEMA (8 g) in toluene for 16 hours at 70° C., to give a functionalized hard block polymer.

SCC polymers H2 to H19 were made similarly, with appropriate modifications, e.g. to control the molecular weight. For example, SCC polymer H2 was prepared by the above procedure with the following modifications: (1) after the reaction mixture had been heated at 60° C. for 16 hours, it was heated at 80° C. for 16 hours to degrade residual AIBN; (2) 3 drops of dibutyl tin dilaurate were added with the IEMA; and (3) the reaction with the IEMA was conducted at 25° C. for 16 hours, instead of 70° C. for 16 hours. SCC polymer H16 was prepared by the above procedure with the following modifications: (1) the amount of toluene was 1000 mL and the amount of mercaptoethanol was 5.2 g; (2) the heating at 60° C. for 16 hours was followed by heating at 80° C. for 6 hours; and (3) the SCC polymer was functionalized by heating with IEMA (34 g) and dibutyl tin dilaurate (0.2 g) at 30° C. for 16 hours. The SCC polymer H17 was prepared by the above procedure with the following modifications: (1) the amount of toluene was 300 mL, the amount of mercaptoethanol was 1.5 g and the amount of AIBN was 0.3 g; (2) the heating at 60° C. for 16 hours was followed by heating at 80° C. for 8 hours; and (3) the SCC polymer was functionalized by heating with IEMA (10 g) and dibutyl tin dilaurate (7 drops) at 60° C. for 16 hours. The SCC polymer H18 was made by adding C16A (120 g), C18A (30 g), mercaptoethanol (1.5 g) and AIBN (1.5 g) to toluene (300 mL); heating at 60° C. for 16 hours and then at 80° C. for 6 hours; cooling; adding IEMA (12.7.5 g); and stirring at room temperature for 16 hours. The SCC polymer H19 was made by adding C22A (100 g), mercaptoethanol (1 g) and AIBN (1 g) to toluene (200 mL); heating at 60° C. for 16 hours, and then at 80° C. for 6 hours; cooling; adding IEMA (8.5 g) and dibutyltin dilaurate (5 drops); and stirring at room temperature for 16 hours.

Preparation of the TPE's

The TPE of Example 7 was prepared by adding the functionalized SCC polymer H1 (40 g), the butyl acrylate (60 g) and AIBN (1 g) to toluene (200 mL), and heating at 60° C. for 16 hours with stirring. The reaction mixture was cooled and poured into ethanol to recover the TPE as a precipitate, and the precipitate was dried at elevated temperature under reduced pressure. The TPE's of Examples 8–31 were prepared similarly, with appropriate modifications (e.g. the addition of dodecyl mercaptan as a chain transfer agent to control molecular weight).

In Examples 33–40, the H16 functionalized SCC polymer, EHA and HEA, in the amounts shown in Table 4, were added to a reaction vessel, together with ethyl acetate (100 g), heptane (100 g) and AIBN (0.15 g), and heated at 60° C. for 16 hours under nitrogen. The polymer was recovered as in Example 7.

In Example 41, the indicated amounts of H16, EHA, HEA and MPEG were added to a reaction vessel, together with ethyl acetate (140 g), heptane (60 g) and AIBN (0.2 g), and heated at 60° C. for 16 hours.

In Example 42, the indicated amounts of H18, EHA, HEA and MBA were added to a reaction vessel, together with ethyl acetate (112 g), heptane (48 g) and AIBN (0.1 g), and heated at 55° C. for 16 hours and then at 75° C. for 1 hour.

In Example 43, H17 (63.4 g), C12A (119 g), C14A (127 g) and AA (7.6 g) were added to a reaction vessel, together with ethyl acetate (475 g) and AIBN (0.3 g), and heated at 60° C. for 7 hours and then at 75° C. for 7 hours. The polymer, which contained 20% of H17, had a crystalline soft block with a $T_{ms}$ of about 6° C. (and onset of melting at 2° C.) resulting from the C12A and C14A units and a crystalline hard block with a $T_q$ of about 61° C. (and onset of melting at about 54° C.) resulting from the H17 (C22A) macromer.

In Example 44, the indicated 3 amounts of H16, EHA and HEA were added to a reaction vessel, together with ethylacetate (140 g), heptane (60 g), and AIBN (0.15 g), and heated at 60° C. for 16 hours.

In Example 45, the indicated amounts of H19, EHA and HEA were added to a reaction vessel, together with ethyl acetate (60 mL), heptane (140 mL) and AIBN (0.5 g), and heated at 60° C. for 16 hours.

In Example 46, the indicated amounts of H19, EHA and AA were added to a reaction vessel, together with toluene (180 g) and AIBN (0.5 g), and heated at 60° C. for 16 hours.

Copolymers C1–C13 are random high molecular weight acrylate polymers. Typically they were prepared by adding the monomers and amounts thereof in Table 5 to a reaction vessel, together with ethyl acetate (100 g), heptane (100 g) and AIBN (0.15 g) and heating the reaction mixture at 60° C. for 16 hours under nitrogen. The copolymer was recovered by pouring the cooled reaction mixture into ethanol and drying the precipitate at elevated temperature under reduced pressure.

Preparation of Copolymers WOC1, WOC2 and WOC3

Copolymers WOC1, WOC2 and WOC are low molecular weight random SCC polymers which can be added to PSA's to reduce peel strength on warming. They were prepared in the same general way as C1–C13, using the monomers and amounts thereof shown in Table 6, but taking steps to control the molecular weight.

Preparation and Testing of PSA's

A number of PSA composites were made and tested, as summarized in Table 7 below. Table 7 shows the results for PSA composites in which the PSA comprises a TPE containing SCC hard blocks. A number of the PSA's also contained one of the crystalline SCC additives ("cryst. SCC") WOC1, WOC2 or WOC3. Table 8, which is included for comparison, shows results for comparable PSA's which do not include such SCC hard blocks. Table 9 shows the results of testing on human skin.

Except for PSA composite No. QA141, the PSA composites were made and tested as follows. The specified polymer (s) was dissolved in a suitable solvent, e.g. toluene or heptane, to give a homogeneous, bubble-free composition with a solids content of about 45%. The composition was applied to a polyester TPE ("Hytrel 4056") film 1.75 ml (0.0045 cm) thick, in the following way. The film was secured to a flat glass plate 18×12 inch (46×30.5 cm) and smoothed to remove air bubbles between the film and the plate. A wire-wound applicator rod (No. 70 Gardco Wet Film Applicator Rod) was then used to apply a coating of the composition to the film. The coating was dried in an oven at 90° C. for 30 minutes or more. The dried coating thickness was about 1.6 to 1.8 mil (0.0040 to 0.0046 cm). The coating was covered with a siliconized polyethylene-impregnated paper. The resulting laminate was removed from the glass plate and samples about 4.0×0.5 inch (10×1.25 cm) were cut from the laminate.

PSA composite QA141 was made by coating PSA QA112 by the method described above to give a coating 1 mil thick. This coating was then covered by a coating about 3 microns thick of PSA QA111, by transfer coating from a siliconized Mylar film.

The PSA composites were tested as previously described.

Preparation and Heat Sealing of Films of TPE's

The TPE of Example 43 was formed into a film as follows. The polymer (10 g) was dissolved in a mixture of toluene (12.5 mL) and heptane (12.5 mL), coated onto a siliconized polyester backing and dried at 90° C. The dried film was transferred to a microporous support (Cellgard K878). The random copolymer C13 was formed into a film in the same way. The Example 43 film could readily be heat-sealed o a commercially available film of a blend of polyethylene (PE) and ethylene/vinyl acetate copolymer (EVA). The copolymer C13 film gave a markedly inferior heat seal. The oxygen permeabilities of the Example 43 film and the PE/EVA film were measured and are shown below (in cc-ml/100 $in^2$·atm·24 hrs).

TABLE 1

|  | at 45° F. | at 720° F. |
|---|---|---|
| Example 43 | 1800 | 5150 |
| PE/EVA | 270 | 650 |

| | EXAMPLE NO. | | | | | |
|---|---|---|---|---|---|---|
| | 1 | 2 | 3 | 4 | 5 | 6 |
| SOFT BLOCK INGREDIENTS | | | | | | |
| (i) Starting Polyether | | | | | | |
| POLY-THF 650 | 100 | 10.0 | — | 10.0 | — | 25.22 |
| POLY-THF 4500 | — | — | 10.0 | — | — | — |
| POLY-THF 2000 | — | — | — | — | 41.68 | — |
| (ii) tolylene-2,4-diisocyanate | 27.82 | 2.78 | 0.47 | 2.77 | — | — |
| (iii) amine | | | | | | |
| 2-aminoethane thiol | 0.783 | — | — | — | — | — |
| cysteamine | — | 0.175 | 0.064 | 0.083 | — | — |
| HARD BLOCK INGREDIENTS | | | | | | |
| C18A | 42.71 | 3.89 | 3.84 | — | — | — |
| C22A | — | — | — | 3.99 | — | — |
| AIBN | 0.433 | 0.04 | 0.04 | 0.01 | — | — |
| poly-1,2-octadecene epoxide | — | — | — | — | 11.71 | 8.7 |
| methylene-diphenylene diisocyanate | — | — | — | — | 5.78 | 10.19 |
| PROPERTIES OF TPE PRODUCT | | | | | | |
| $M_w$ | 65 k | 153 k | 181 k | 66 k | 74 | 47 |
| $M_w/M_n$ | 1.8 | 1.7 | 3.4 | 1.8 | 1.5 | 1.7 |
| DSC onset °C. ($T_o$) | — | — | — | — | 45 | 34.3 |
| DSC peak °C. ($T_g$) | 48.2 | 45 | 48* | 61 | 47.9† | 39.4 |
| DSC heat of fusion J/g | 3.7 | 1.7 | 14 | 4.9 | 8.6 | 20.9 |

*The TPE of Example 3 also showed a peak at 24.3° C. which was attributable to the crystallinity of the POLY-THF in the soft block.

†The TPE of Example 5 also showed a peak at 21.7° C. which was attributable to the crystallinity of the POLY-THF in the soft block.

TABLE 2

| | HARD BLOCK TYPE | | | | | | | | | |
|---|---|---|---|---|---|---|---|---|---|---|
| | H1 | H2 | H3 | H4 | H5 | H6 | H7 | H8 | H9 | H10 |
| HARD BLOCK INGREDIENTS | | | | | | | | | | |
| C16A | — | 8 | — | — | — | — | — | — | — | — |
| C18A | — | 92 | 100 | — | 15 | 25 | — | — | — | — |
| C22A | 100 | — | — | — | — | — | — | 100 | — | — |
| C18MA | — | — | — | 100 | 85 | 75 | 66 | — | — | — |
| C22MA | — | — | — | — | — | — | — | — | — | — |
| C22 IEMA | — | — | — | — | — | — | 34 | — | 100 | — |
| C30 IEMA | — | — | — | — | — | — | — | — | — | 100 |
| C4A | — | — | — | — | — | — | — | — | — | — |
| HARD BLOCK PROPERTIES | | | | | | | | | | |
| $M_w$ | 4300 | 3900 | 3900 | 3900 | 3600 | 3900 | 4300 | 9700 | 6000 | 3100 |
| $M_w/M_n$ | 1.26 | 1.34 | 1.33 | 1.32 | 1.32 | 1.33 | 1.33 | 1.3 | 1.37 | 1.3 | 1.4 |
| DSC onset °C. | 57 | 39 | 42 | 33 | 33 | 33 | 34 | 65 | 71 | 72 |
| DSC peak °C. ($T_m$) | 62 | 42 | 45 | 36 | 36 | 37 | 42 | 67 | 74 | 79 |
| Heat of fusion J/g | 133 | 83 | 118 | 74 | 76 | 79 | 69 | 108 | 103 | 159 |

| | HARD BLOCK TYPE | | | | | | | | |
|---|---|---|---|---|---|---|---|---|---|
| | H11 | H12 | H13 | H14 | H15 | H16 | H17 | H18 | H19 |
| HARD BLOCK INGREDIENTS | | | | | | | | | |
| C16A | — | — | 80 | — | — | 400 | — | 120 | — |
| C18A | — | — | 20 | — | 80 | 100 | — | 30 | — |
| C22A | — | — | — | — | — | — | 150 | — | 100 |
| C18MA | 76 | 50 | — | 80 | — | — | — | — | — |
| C22MA | — | 50 | — | 20 | — | — | — | — | — |
| C22 IEMA | 24 | — | — | — | — | — | — | — | — |
| C30 IEMA | — | — | — | — | — | — | — | — | — |
| C4A | — | — | — | — | 20 | — | — | — | — |
| HARD BLOCK PROPERTIES | | | | | | | | | |
| $M_w$ | 5900 | 5300 | 12,300 | 5500 | 8900 | 13,100 | 6700 | 11,700 | 9000 |
| $M_w/M_n$ | 1.29 | 1.35 | 1.65 | 1.29 | 1.6 | 1.66 | 1.2 | 1.56 | 1.27 |
| DSC onset °C. | 35 | 43 | 35 | 31 | 32 | 35 | | | |
| DSC peak °C. ($T_m$) | 42 | 47 | 38 | 36 | 38 | 38 | 63 | | |
| Heat of fusion J/g | 57 | 72 | 67 | 58 | 45 | | | | |

TABLE 3

| | INGREDIENTS OF TPE | | | PROPERTIES OF TPE | | | | | | | |
|---|---|---|---|---|---|---|---|---|---|---|---|
| | | | | | DSC | | | | | | |
| Ex. | Hard Block | | Soft Block | $M_w$ | | $T_o$ (Onset) | $T_q$ (Peak) | Heat of Fusion | XL Time | TS kg/ | El | YM kg/ |
| No. | Type | Amt | Amt | $M_w$ | $M_n$ | °C. | °C. | J/g | sec | cm² | % | cm² |
| 7 | H1 | 40 | 60 | 179 k | 4.83 | 57 | 62 | 45 | — | 22 | 53 | 105 |
| 8 | H11 | 40 | 60 | 96 k | 3.5 | 34 | 39 | 16 | — | — | — | — |
| 9 | H3 | 40 | 60 | 184 k | 5.9 | 38 | 43 | 28 | >15 | | | |
| 10 | H3 | 40 | 60 | 48 k | 2.3 | 39 | 42 | 33 | >15 | | | |
| 11 | H3 | 40 | 60 | 103 k | 3.9 | 37 | 43 | 30 | >15 | | | |
| 12 | H4 | 40 | 60 | 40 k | 2.2 | 37 | 41 | 28 | 16 | | | |
| 13 | H4 | 40 | 60 | 80 k | 3.1 | 38 | 41 | 28 | 24 | | | |
| 14 | H5 | 40 | 60 | 48 k | 3.0 | 30 | 33 | 16 | 54 | | | |
| 15 | H6 | 40 | 60 | 52 k | 2.5 | 30 | 33 | 17 | 29 | | | |
| 16 | H6 | 30 | 70 | 56 k | 2.6 | 29 | 32 | 11 | 51 | | | |
| 17 | H4 | 30 | 70 | 55 k | 2.6 | 27 | 29 | 9 | 97 | | | |
| 18 | H6 | 20 | 80 | 57 k | 2.8 | 28 | 31 | 9 | 135 | | | |
| 19 | H4 | 20 | 80 | 53 k | 2.3 | 25 | 29 | 8 | 154 | | | |
| 20 | H7 | 40 | 60 | 55 k | 2.1 | 38 | 43 | 13 | 25 | | | |
| 21 | H7 | 30 | 70 | 64 k | 2.1 | 36 | 42 | 13 | 25 | | | |
| 22 | H7 | 20 | 80 | 63 k | 2.0 | 35 | 40 | 6 | 17 | | | |
| 23 | H7 | 30 | 70 | 96 k | 2.8 | 37 | 43 | 10 | 20 | | | |

TABLE 3-continued

| | INGREDIENTS OF TPE | | | PROPERTIES OF TPE | | | | | | | |
|---|---|---|---|---|---|---|---|---|---|---|---|
| | Hard Block | | Soft Block | | | DSC | | | | | |
| Ex. No. | Type | Amt | Amt | $M_w$ | $M_n$ | $T_o$ (Onset) °C. | $T_q$ (Peak) °C. | Heat of Fusion J/g | XL Time sec | TS kg/cm² | El % | YM kg/cm² |
| 24 | H1 | 50 | 50 | 173 k | 4.96 | 58 | 63 | 50 | — | 28 | 33 | 187 |
| 25 | H1 | 30 | 70 | 176 k | 4.49 | 58 | 62 | 39 | — | 18 | 86 | 74 |
| 26 | H8 | 40 | 60 | 168 k | 4.54 | 62 | 66 | 48 | — | 14 | 94 | 67 |
| 27 | H8 | 40 | 60 | 51 k | 1.88 | 63 | 65 | 57 | — | 11 | 14 | 159 |
| 28 | H8 | 40 | 60 | 97 k | 3.14 | 63 | 65 | 56 | — | 15 | 35 | 162 |
| 29 | H8 | 40 | 60 | 168 k | 4.57 | 62 | 66 | 48 | — | 14 | 94 | 66 |
| 30 | H9 | 50 | 50 | 310 k | 13.4 | 64 | 69 | 44 | — | 68 | 37 | 607 |
| 31 | H10 | 30 | 70 | 178 k | 9.7 | 65 | 79 | 36 | — | 33 | 42 | 261 |

EXAMPLES 32A, B and C

A. A composition containing RDX (an explosive), 75 parts, and a TPE of the invention having a $T_q$ of 74° C., 25 parts, can be made as follows. The TPE is heated to about 84° C. in a high shear mixer; half the RDX is added and mixed with the TPE for 20 minutes; the remainder of the RDX is then added and mixing is continued until a uniform composition is obtained. The mixture does not have a restricted pot life at 84° C. It can be shaped by extrusion to give a solid with an elongation of 20% or more. The formed product, and scrap, can be reprocessed.

B. Seed-containing compositions can be prepared by dissolving a TPE of the invention in a suitable solvent (e.g. 2 g of TPE in 5 ml, Of a 1/1 mixture of heptane and ethyl acetate), using the solution to coat the seeds (e.g. by placing bush beans in a vessel and adding the solution), and drying the seeds, which are thus provided with a thin continuous coating of the TPE.

C. The complex modulus of a TPE of the invention having a $T_q$ of 48° C. was measured at various temperatures at 0.05 radians/second, with the following results:

| Temperature | 40 | 53 | 67 | 80 |
|---|---|---|---|---|
| Complex Modulus | 50,000,000 | 2000 | 1000 | 2000 |

The complex modulus of an SCC hard block polymer having a $T_m$ of 43° C. was measured at various temperatures at 0.01 radians/second, with the following results:

| Temperature | 40 | 50 | 75 | 100 |
|---|---|---|---|---|
| Complex Modulus | 50,000,000 | 100 | 20 | 5 |

TABLE 4

| | Hard Block | | Soft Block | | | $M_w$ | | |
|---|---|---|---|---|---|---|---|---|
| Ex. No. | Type | Amt | EHA | AA | HEA | Mw | $M_n$ | Viscosity |
| 33 | H16 | 1 | 94 | 5 | — | 488 k | 6.6 | 231 |
| 34 | H16 | 2 | 93 | 5 | — | 700 k | 11.0 | 587 |
| 35 | H16 | 3 | 92 | — | 5 | 557 k | 4.4 | — |
| 36 | H16 | 3 | 92 | 5 | — | 1100 k | 2.5 | 1313 |
| 37 | H16 | 5 | 90 | 5 | — | 967 k | 4.0 | 2600 |
| 38 | H16 | 5 | 87 | — | 8.2 | 895 k | 2.86 | — |

TABLE 4-continued

| | Hard Block | | Soft Block | | | $M_w$ | | |
|---|---|---|---|---|---|---|---|---|
| Ex No. | Type | Amt | EHA | AA | HEA | Mw | $M_n$ | Viscosity |
| 39 | H16 | 5 | 87 | — | 8 | 554 k | 19.4 | — |
| 40 | H16 | 5 | 87 | — | 8 | >1000 k | 14.1 | 25.6 k |
| 41 | H16 | 5 | 82 | — | 8+ | — | — | >10 k |
| 42 | H18 | 5 | 62 | — | 8+ | 721 k | 9.4 | 5350 |
| 43 | H17 | 20 | 80++ | — | — | 326 k | — | — |
| 44 | H16 | 5 | 87 | — | 8 | 895 k | 2.85 | 1960 |
| 45 | H19 | 5 | 87 | — | 8 | — | — | — |
| 46 | H19 | 6 | 108 | 6 | — | 272 k | 3.8 | — |

+In Examples 41 and 42, the soft block monomers also included 5 g MPEG (Example 41) or 25 g MBA (Example 42)
++In Example 43, the soft block was formed from C12A, C14A and AA (50/47/3)

TABLE 5

| | Ingredients | | | | | |
|---|---|---|---|---|---|---|
| Copolymer | EHA | HEA | C4A/C14A/C18A | AA | $M_w$ | $M_w/M_n$ |
| C1 | 92 | 8 | — | — | 1200 k | 2.38 |
| C2 | 96 | 4 | — | — | 318 k | 7.7 |
| C3 | 92 | 8 | — | — | 401 k | 3.2 |
| C4 | 95 | — | — | 5 | 1002 k | 1.76 |
| C5 | 92 | 8 | — | — | 504 k | 4.3 |
| C6 | 92 | 8 | — | — | 1750 k | 1.7 |
| C7 | 92 | 8 | — | — | >1000 k | — |
| C8 | 92 | 8 | — | — | 882 k | 4.9 |
| C9 | 87 | 5 | 8 (C18A) | — | 984 k | 5.9 |
| C10 | 90 | — | 5 (C18A) | 5 | — | — |
| C11 | 47 | — | 47 (C4A) | 6 | >1000 k | — |
| C12 | 97 | — | — | 3 | 629 k | 6.21 |
| C13 | 47 | — | 3 (C14A) | — | — | — |

C9 had a viscosity of 3000 cps. C10 had a viscosity of 400 cps.

TABLE 6

| | Ingredients | | | | |
|---|---|---|---|---|---|
| Copolymer | C16A | C18A | AA | $M_w$ | $M_w/M_n$ |
| WOC1 | 54.1 | 40.9 | 5.0 | 2.5 k | 1.48 |
| WOC2 | 54.1 | 40.9 | 5.0 | 3.7 k | 1.5 |
| WOC3 | 95 | — | 5 | 2 k | 1.57 |

TABLE 7

| | PSA No. | Base Resin Type | Base Resin Amt | Cryst. SCC Type | Cryst. SCC Amt | Shear | Tack |
|---|---|---|---|---|---|---|---|
| A1. Base Resin is EHA/AA/H16, (95-x)/5/x | | | | | | | |
| x = 1 | QA11 | Ex 33 | 100 | — | — | 180 | 16 |
| x = 2 | QA12 | Ex 34 | 100 | — | — | 916 | 14 |
| x = 3 | QA13 | Ex 36 | 100 | — | — | 1637 | 11 |
| x = 5 | QA14 | Ex 37 | 100 | — | — | >10 k | >30 |
| A2. Base Resin is | QA21 | Ex 33 | 100 | — | — | 180 | 16 |
| EHA/AA/H16, 94/5/1 | QA22 | Ex 33 | 90 | WOC1 | 10 | 329 | |
| | QA23 | Ex 33 | 80 | WOC1 | 20 | 694 | |
| | QA24 | Ex 33 | 70 | WOC1 | 30 | 611 | |
| A3. Base Resin is | QA31 | Ex 34 | 100 | — | 0 | 916 | 14 |
| EHA/AA/H16, 93/5/2 | QA32 | Ex 34 | 90 | WOC1 | 10 | 2060 | |
| | QA33 | Ex 34 | 80 | WOC1 | 20 | 2719 | |
| | QA34 | Ex 34 | 70 | WOC1 | 30 | 2774 | |
| A4. Base Resin is | QA41 | Ex 35 | 100 | — | 0 | 470 | 12 |
| EHA/HEA/H16, 92/5/3 | QA42 | Ex 35 | 90 | WOC1 | 10 | 1143 | |
| | QA43 | Ex 35 | 80 | WOC1 | 20 | 1575 | |
| | QA44 | Ex 35 | 70 | WOC1 | 30 | 2770 | |
| A5. Base Resin is | QA51 | Ex 37 | 100 | — | 0 | >10 k | >30 |
| EHA/AA/H16, 90/5/5 | QA52 | Ex 37 | 90 | WOC1 | 10 | 20,000 | |
| | QA53 | Ex 37 | 80 | WOC1 | 20 | — | |
| | QA54 | Ex 37 | 70 | WOC1 | 30 | 27,000 | |
| A6. Base Resin is | QA61 | Ex 39 | 100 | — | 0 | 595 | 1.6 |
| EHA/HEA/H16, 87/8/5 | QA62 | Ex 39 | 90 | WOC1 | 10 | 787 | |
| | QA63 | Ex 39 | 80 | WOC1 | 20 | 957 | |
| | QA64 | Ex 39 | 70 | WOC1 | 30 | 672 | |
| | QA65 | Ex 40 | 100 | WOC1 | 0 | 2090 | |
| | QA66 | Ex 40 | 75 | WOC1 | 25 | >86 k | |
| | QA67 | Ex 40 | 75 | WOC1 | 25 | 139 k | |
| A7. Base Resin is | QA71 | Ex 41 | 100 | — | — | 1900 | 9.76 |
| EHA/HEA/H16, MPEG, 82/5/8/5 | QA72 | Ex 41 | 75 | WOC2 | 25 | 2820 | — |
| A8. Base Resin is | QA81 | Ex 42 | 100 | — | — | 5055 | 16.3 |
| EHA/HEA/H16, 3MBA, 62/8/5/25 | QA82 | Ex 42 | 75 | WOC2 | 25 | >86 k | |
| A9. Base Resin is | QA91 | Ex 46 | 100 | — | — | 1722 | 3.4 |
| EHA/HEA/H19, 87/8/5 | QA92 | Ex 46 | 75 | WOC2 | 25 | >86 k | — |
| | QA93 | Ex 46 | 37.5 | | | | |
| | | C6 | 12.5 | | | | |
| | | C7 | 12.5 | | | | |
| | | C8 | 12.5 | WOC2 | 25 | 717 | |
| A10. Base Resin is | QA101 | Ex 46 | 100 | — | — | 1655 | 10 |
| EHA/AA/H19, 90/5/5 | QA102 | Ex 46 | 80 | WOC1 | 20 | 3844 | — |

TABLE 8

| | PSA No. | Base Resin Type | Base Resin Amt | Cryst. SCC Type | Cryst. SCC Amt | Shear | Tack |
|---|---|---|---|---|---|---|---|
| B1. Base Resin is EHA/HEA 96/4 | QB11 | C2 | 100 | — | 0 | — | — |
| B2. Base Resin is EHA/HEA 92/8 | QB21 | C3 | 100 | — | 0 | — | 1.9 |
| B3. Base Resin is | QB31 | C4 | 100 | — | 0 | 701 | 2.8 |
| EHA/HEA 95/5 | QB32 | C4 | 80 | WOC1 | 20 | 524 | |
| | QB33 | C4 | 70 | WOC1 | 30 | 495 | |
| | QB34 | C4 | 60 | WOC1 | 40 | 399 | |
| B4. Base Resin is | QB41 | C5 | 100 | — | 0 | 0 | |
| EHA/HEA 92/8 | QB42 | C5 | 90 | WOC1 | 10 | 0 | |
| | QB43 | C5 | 80 | WOC1 | 20 | 0 | |
| | QB44 | C5 | 70 | WOC1 | 30 | 0 | |
| B5. Base Resin is | QB51 | C9 | 100 | — | 0 | 12.6 | 1.1 |
| EHA/HEA/C18A, 87/8/5 | QB52 | C9 | 75 | WOC2 | 25 | 23 | — |
| B6. Base Resin is | QB61 | C10 | 100 | — | 0 | 148 | 14.1 |
| EHA/HEA/C18A, 90/5/5 | QB62 | C10 | 75 | WOC2 | 25 | 164 | |
| B7. Base Resin is | QB71 | C1 | 75 | WOC3 | 25 | 17 | |

TABLE 8-continued

| | PSA | POLYMERS | | | | PROPERTIES | |
| | | Base Resin | | Cryst. SCC | | | |
| | No. | Type | Amt | Type | Amt | Shear | Tack |
|---|---|---|---|---|---|---|---|
| EHA/HEA, 92/8 | | | | | | | |
| B8. Base Resin is | QB81 | C4 | 63 | | | | |
| EHA/AA, 95/5 + | | C12 | 7 | WOC3 | 30 | 312 | |
| EHA/AA 97/3 | | | | | | | |
| B9. Base Resin is | QB91 | C6 | 25 | | | | |
| EHA/HEA, 92/8 | | C7 | 25 | | | | |
| | | C8 | 25 | WOC2 | 25 | 77 | |
| B10. Base Resin is | QB101 | C2 | 99 | WOC2 | 1 | | 4.5 |
| EHA/HEA, 96/4 | QB102 | C2 | 97 | WOC2 | 3 | | 6.0 |
| | QB103 | C2 | 95 | WOC2 | 5 | | 11.0 |
| | QB104 | C2 | 90 | WOC2 | 10 | | 25.3 |
| | QB105 | C2 | 75 | WOC2 | 25 | | >30 |
| B11. Base Resin is | QB111 | C3 | 99 | WOC2 | 1 | | 2.8 |
| EHA/HEA, 9218 | QB112 | C3 | 97 | WOC2 | 3 | | 12.9 |
| | QB113 | C3 | 95 | WOC2 | 5 | | 18.7 |
| | QB114 | C3 | 90 | WOC2 | 10 | | 20.4 |
| | QB115 | C3 | 75 | WOC2 | 25 | | 30.0 |
| B12. Base Resin is | QB121 | C11 | 100 | — | — | 600 | 10 |
| EHA/C4A/AA, 47/47/6 | | | | | | | |

TABLE 9

Peel Strengths of PSA's on Human Skin

| | PSA Adhesive | | | | | | | | |
|---|---|---|---|---|---|---|---|---|---|
| | QA67 | QB71 | QB81 | QA92 | QA93 | QB91 | QA101 | QB121 | QA141 |
| After 0.5 hr, at LT | — | 60 | — | — | — | — | — | — | — |
| at HT | — | 6 | — | — | — | — | — | — | — |
| % reduction | — | 90% | — | — | — | — | — | — | — |
| After 1 hr, at LT | 29 | — | 23.8 | 14 | 40 | 55 | 43 | 44 | 26 |
| at HT | 3 | — | 3.4 | 2 | 5.5 | 2.5 | — | — | 2.1 |
| % reduction | 89% | — | 86% | 85% | 26% | 95% | — | — | 92% |
| After 24 hr, at LT | 80 | 211 | 89 | — | — | — | 79.5 | 78 | — |
| at HT | 9.5 | 21 | 29 | — | 9 | — | — | — | — |
| % reduction | 88% | 90% | 67% | — | 91% | — | — | — | — |
| After 48 hr, at LT | 90 | — | 89 | — | — | — | — | — | — |
| at HT | 12 | — | 38 | — | — | — | — | — | — |
| % reduction | 87% | — | 57 | — | — | — | — | — | — |
| Sheer Strength | 139 k | 17 | 312 | >86 k | 717 | 77 | 1655 | 600 | 1906 |

We claim:

1. A thermoplastic elastomer (TPE) comprising polymeric molecules which comprise
   (i) at least two polymeric A blocks,
      (a) each of the A blocks being crystalline and having a melting point $T_q$, and
      (b) at least one of the A blocks comprising a side chain comprising crystallizable moieties which render the block crystalline; and
   (ii) at least one polymeric B block which
      (a) is linked to at least two A blocks,
      (b) is amorphous at temperatures at which the TPE exhibits elastomeric behavior,
      (c) has a glass transition point $T_{gs}$ which is less than $(T_q-10)°$ C., and
      (d) is selected from the group consisting of polyethers, polyacrylates, polyamides, polyurethanes and polysiloxanes.

2. A method of making a TPE as defined in claim 1, which process comprises

I. reacting together
      (i) an A block precursor which is the A block containing at least one reactive group J, and
      (ii) a B block precursor which is the B block containing at least two reactive groups K, which may be the same or different, which will react with the reactive group J or with a linking molecule which will react with the group K and the group J, to form a link which is part of the polymer backbone,
   the molar ratio of (i) to (ii) being at least 2, thus making a TPE of the ABA, $A_nB$, or $(AB)_n$ type; or
   II. reacting together
      (i) a B block precursor which is the B block containing at least two reactive groups L, which may be the same or different,
      (ii) (a) a monomeric component comprising at least one monomer which will react with the group L and with itself or with a reactive group resulting from reaction of the monomeric component with the B block precursor, to form the A block, or
      (b) an A block precursor which is the A block containing at least one reactive ground M which will react with the group L to form the A block; or
   III. reacting together
      (i) an A block precursor which is the A block terminated by a reactive group N, and (ii) a monomeric component comprising at least one monomer which will react with the group N and with itself to form the B block with at least two A blocks pendant from the polymeric backbone or the soft block;

IV. performing a living polymerization in which the monomers for the A and B blocks are polymerized separately and sequentially, using an initiator so that the growing polymer chain has a terminal group which reacts with the monomer present at that time and in turn produces a reactive terminal group on the residue of the monomer which has reacted with the growing polymer chain.

3. A composition, shaped article or assembly which comprises
   (1) TPE as defined in claim 1, and
   (2) second component which is mixed with the TPE or which is surrounded by the TPE, or which provides a substrate for the TPE.

4. A composition according to claim 3, wherein the second component is intimately mixed with the TPE and is a crystalline polymeric additive which
   (a) has a first order transition point $T_a$ in the composition of 23° to 120° C., and
   (b) has a heat of fusion of at least 5 Joules/g.

5. A composition according to claim 4 having a shear value which is at least 1.3 times the shear value of a composition which is identical except that it does not contain the crystalline additive.

6. A composition according to claim 4 which also contains an amorphous polymer which is intimately mixed with the TPE and the crystalline additive.

7. A TPE according to claim 1 which is an ABA block copolymer.

8. A thermoplastic elastomer (TPE) comprising polymeric molecules which comprise
   (i) at least two polymeric A blocks,
      (a) each of the A blocks being crystalline and having a melting point $T_g$, and
      (b) at least one of the A blocks comprising a side chain comprising crystallizable moieties which render the block crystalline; and
   (ii) at least one polymeric B block which
      (a) is linked to at least two A blocks,
      (b) is crystalline and has a melting point $T_{ms}$ which is less than $(T_q-10)°$ C., and
      (c) comprises 50 to 100% by weight of units derived from at least one n-alkyl acrylate, n-alkyl acrylamide, n-alkyl methacrylate, or n-alkyl methacrylamide in which the n-alkyl group contains 4 to 16 carbon atoms, and the A block comprises 50 to 100% by weight of units derived from at least one n-alkyl acrylate, n-alkyl acrylamide, n-alkyl methacrylate, or n-alkyl methacrylamide, in which the n-alkyl group contains at least 16 carbon atoms.

9. A TPE according to claim 8 wherein the B blocks comprise 75 to 100% by weight of units derived from C12 Acrylate or C14 Acrylate or both, and the A blocks comprise 75 to 100% of units derivable from C22 Acrylate.

10. A composition which comprises
    (1) a thermoplastic elastomer (TPE) comprising polymeric molecules which comprise
       (i) at least two polymeric A blocks,
          (a) cash of the A blocks being a crystalline polyacrylate or polymethactylate and having a melting point $T_q$, and
          (b) at least one of the A blocks comprising a side chain comprising crystallizable moieties which render the block crystalline; and
       (ii) at least one polymeric B block which
          (a) is linked to at least two A blocks,
          (b) is crystalline and has a melting point $T_{ms}$ which is less than $(T_q-10)°$ C., and
          (c) is a polyacrylate or polymethacrylate, and
    (2) a second component which is intimately mixed with the TPE and is a crystalline polymeric additive which
       (a) has a first order transition point $T_a$ in the composition of 23° to 120° C., and
       (b) has a heat of fusion of at least 5 Joules/g, and
       (c) is a polyacrylate or polymethacrylate.

11. A composition which comprises
    (1) a thermoplastic elastomer (TPE) comprising polymeric molecules which comprise
       (i) at least two polymeric A blocks, each of the A blocks containing 50 to 100% of units containing linear unsubstituted alkyl groups containing 12 to 50 carbon atoms or linear substituted alkyl groups containing 6 to 50 carbon atoms, and
    (2) a second component which is intimately mixed with the TPE and is a crystalline additive which comprises repeating units of the general formula $$-\underset{\underset{Cy}{|}}{Y}-$$

where Y is an organic radical forming part of the polymer backbone and Cy comprises a crystallizable moiety containing 12 to 20 carbon atoms.

12. A composition according to claim 11 which also contains an amorphous polyacrylate which is intimately mixed with the TPE and the crystalline additive.

13. A composition according to claim 11 wherein each of the A blocks comprises 3 to 15% by weight of units derived from 2-hydroxyethyl acrylate.

14. A process for making a shaped article of a polymeric composition comprising a thermoplastic elastomer (TPE) comprising polymeric molecules which comprise
   (i) at least two polymeric A blocks,
      (a) each of the A blocks being crystalline and having a melting point $T_g$, and
      (b) at least one of the A blocks comprising a side chain comprising crystallizable moieties which render the block crystalline; and
   (ii) at least one polymeric B block which is linked to at least two A blocks,
      (b) is crystalline and has a melting point $T_{ms}$ which is less than $(T_q-10)°$ C.,
      (c) is amorphous and has a glass transition point $T_{gs}$ which is less than $(T_q-10)°$ C.,
   which process comprises:
   (A) melting the polymeric composition,
   (B) dispersing a second component in the molten TPE,
   (C) melt shaping the dispersion from step B, and
   (D) cooling the shaped article from step C to a temperature below $T_q$.

15. A thermoplastic elastomer (TPE) comprising polymeric molecules comprising at least two crystalline A blocks and at least one B block, wherein at least one of said A blocks is a side-chain crystallizable polymeric block which has a crystalline melting point of about 0° to 200° C. and comprises a plurality of repeating units of the formula

wherein Y is a divalent radical which forms part of the backbone of the block, and Cy comprises a crystallizable moiety, and said at least one B block is linked to at least two A blocks and is a polymeric block which has a glass transition temperature $T_g$ below about 0° C. which is amorphous at temperatures at which the thermoplastic elastomer exhibits elastomeric behavior, and which is selected from the group consisting of polyethers, polyacrylates, polyamides, polyurethanes and polysiloxanes;

said TPE having been prepared by a process which comprises (1) reacting together
  (a) an A block precursor which is an A block terminated by at least one functional group, and
  (b) a B block precursor which is a B block terminated by at least two functional groups which will react with the functional groups in the A block precursor,
thus preparing an $(AB)_n$, ABA or $A_nB$ block copolymer, where n is at least 2; or (2) reacting together
  (a) a B block precursor which is a B block terminated by at least two functional groups, and
  (b) at least one A block monomer which will react with the functional groups on the B block precursor and will form polymeric A blocks attached to the B block;
thus preparing an ABA or $A_nB$ block copolymer, where n is at least 2; or (3) (i) reacting together
  (a) an A block precursor which is a living polymer, and
  (b) at least one B block monomer which will polymerize directly on the A block precursor, and
  (ii) reacting the product of step (i) with at least one A block monomer which will polymerize directly on said product,
thus preparing an ABA or $(AB)_n$ block copolymer, where n is at least 2.

16. A TPE according to claim 15 which contains at least one said side-chain crystallizable polymeric block having a crystalline melting point of about 60° C. to 100° C.

17. A TPE according to claim 16 which contains at least one said side-chain crystallizable polymeric block which melts over a temperature range of less than about 10° C.

18. A TPE according to claim 15 wherein the B block is amorphous at all temperatures and has a $T_g$ of less than about −20° C.

19. A TPE according to claim 15 wherein the side-chain crystallizable block has a heat of fusion of at least 20 J/g.

20. A TPE according to claim 15 comprising at least about 30 wt. % B blocks and less than about 70 wt. % A blocks.

21. A TPE according to claim 15 which is an $A_nB$ block copolymer, where n is at least 2.

22. A TPE according to claim 15 which is an ABA block copolymer.

23. A TPE according to claim 15 which is an $(AB)_n$ block copolymer.

24. A TPE according to claim 15 having a number average molecular weight in the range of about 10,000 to 200,000.

25. A TPE according to claim 15 wherein at least one of the side-chain crystallizable polymeric A blocks is a polymeric block in which there are other repeating units in addition to the repeating units of the formula —Y(Cy)— and in which the same of the molecular weights of the Cy moieties is at least twice the molecular weight of the parts of the side chain crystallizable polymeric block which are not Cy moieties.

26. A TPE according to claim 15 wherein at least some of the Cy radicals contain crystallizable moieties containing 30 to 50 carbon atoms.

27. A TPE according to claim 15 wherein said B block is selected from the group consisting of poly(vinyl ethers), poly(butadienes), polyesters, poly(siloxanes), polyethers polyurethanes, and polybutylacrylates.

28. A TPE according to claim 15 wherein said B block is a poly(propylene glycol), poly(tetramethylene ether), poly(methyl vinyl ether), poly(butylacrylate), poly(isobutylene) or poly(dialkyl siloxane) block.

29. A thermoplastic elastomer (TPE) comprising polymeric molecules comprising at least two crystalline A blocks and at least one B block, wherein at least one of said A blocks is a side-chain crystallizable polymeric block which has a crystalline melting point of about 0° to 200° C. and comprises a plurality of

repeating units derived from one or more monomers selected from the group consisting of linear aliphatic $C_{14-50}$ acrylates, linear aliphatic $C_{14-50}$ methacrylates, linear aliphatic $C_{6-50}$ fluoroacrylates, linear aliphatic $C_{14-50}$ acrylamides, linear aliphatic $C_{14-50}$ methacrylamides, linear aliphatic $C_{14-50}$ alkyl oxazolines, linear aliphatic $C_{14-50}$ vinyl ethers, linear aliphatic $C_{14-50}$ vinyl esters, linear aliphatic $C_{14-50}$ a-olefins, linear aliphatic $C_{14-50}$ 1,2-epoxides, and linear aliphatic $C_{14-50}$ alkyl glycidyl ethers, and said at least one B block is linked to at least two A blocks and is a polymeric block which has a glass transition temperature $T_g$ below about 0° C. and which is amorphous at temperatures at which the thermoplastic elastomer exhibits elastomeric behavior;

said TPE having been prepared by a process which comprises (1) reacting together
  (a) an A block precursor which is an A block terminated by at least one functional group, and
  (b) a B block precursor which is a B block terminated by at least two functional groups which will react with the functional groups in the A block precursor,
thus preparing an $(AB)_n$, ABA or $A_nB$ block copolymer, where n is at least 2; or (2) reacting together
  (a) a B block precursor which is a B block terminated by at least two functional groups, and
  (b) at least one A block monomer which will react with the functional groups on the B block precursor and will form polymeric A blocks attached to the B block;
thus preparing an ABA or $A_nB$ block copolymer, where n is at least 2; or (3) (i) reacting together
  (a) an A block precursor which is a living polymer, and
  (b) at least one B block monomer which will polymerize directly on the A block precursor, and
  (ii) reacting the product of step (i) with at least one A block monomer which will polymerize directly on said product,
thus preparing an ABA or $(AB)_n$ block copolymer, where n is at least 2.

30. An energetic composition comprising:
(a) a binder of a thermoplastic elastomer (TPE) comprising polymeric molecules comprising at least two A blocks and at least one B block, wherein (i) at least one of said A blocks is a side-chain crystallizable polymeric block which has a crystalline melting point of about 0° to 200° C. and comprises a plurality of repeating units of the formula

wherein Y is a divalent radical which forms part of the backbone of the block, and Cy comprises a crystallizable moiety, and (ii) said at least one B block is linked to at least two A blocks and is a polymeric block which has a glass transition temperature $T_g$ below about 0° C. which is amorphous at temperatures at which the thermoplastic elastomer exhibits elastomeric behavior and which is selected from the group consisting of polyethers, polyacrylates, polyamides, polyurethanes, and polysiloxanes; and
(b) intimately admixed with said binder, at least 20% by weight based on the weight of the composition, of an energetic solid.

31. A composition according to claim 30 wherein the TPE contains a said side-chain crystallizable polymeric block having a crystalline melting point of about 60° C. to 110° C.

32. A composition according to claim 30 wherein the TPE contains a said side-chain crystallizable polymeric block having a crystalline melting point of about 75° C. to 105° C.

33. A composition according to claim 30 wherein the TPE contains a said side-chain crystallizable polymeric block having a heat of fusion of at least 20 J/g.

34. A composition according to claim 30 wherein each of the A blocks in the TPE is a said side chain crystallizable block.

35. A thermoplastic elastomer (TPE) comprising polymeric molecules comprising at least two A blocks and at least one B block which is linked to at least two A blocks, at least one of said A blocks being a side-chain crystallizable polymeric block which has a crystalline melting point $T_q$ of 20° C. to 150° C. and comprises a plurality of repeating units of the formula

wherein Y is a divalent radical which forms part of the backbone of the block, and Cy comprises a crystallizable moiety, and said B block being selected from the group consisting of poly(vinyl ethers), polybutadienes, polysiloxanes, polyethers, polyurethanes, and poly(butylacrylates) and having a glass transition point less than 0° C.

36. A TPE according to claim 35 wherein $T_q$ is 60° to 100° C.

37. A TPE according to claim 35 wherein $T_q$ is 75° to 105° C.

38. A TPE according to claim 35 wherein each of the A blocks is a said side chain crystallizable polymeric block which melts over a temperature range of less than about 10° C.

39. A TPE according to claim 35 wherein each of the A blocks has a heat of fusion of at least 20 J/g.

40. A TPE according to claim 35 which has a complex modulus of $Q_1$ dynes/cm$^2$ at a temperature below $T_q$ and of less than $Q_1 \times 10^{-3}$ dynes/cm$^2$ at $(T_q+10)°$ C.

41. A TPE according to claim 35 having a number average molecular weight of about 10,000 to 200,000.

42. A TPE according to claim 35 wherein at least one of the side-chain crystallizable polymeric A blocks is a polymeric block in which there are other repeating units in addition to the repeating units of the formula —Y(Cy)— and in which the sum of the molecular weights of the Cy moieties is at least twice the molecular weight of the parts of the side chain crystallizable polymeric block which are not Cy moieties.

43. A TPE according to claim 35 wherein Cy contains more than twelve carbon atoms.

44. A thermoplastic elastomer (TPE) comprising polymeric molecules comprising at least two A blocks and at least one B block which is linked to at least two A blocks, at least one of said A blocks being a side-chain crystallizable polymeric block which has a crystalline melting point $T_q$ of 20° C. to 150° C. and comprises a plurality of repeating units of the formula

wherein Y is a divalent radical which forms part of the backbone of the block, and Cy comprises a crystallizable moiety, and said B block being a poly(propylene glycol), poly(tetramethylene ether), poly(methyl vinyl ether), poly(butylacrylate), poly(isobutylene) or poly(dialkyl siloxane) block and having a glass transition point less than 0° C.

45. A thermoplastic elastomer (TPE) comprising polymeric molecules comprising at least two A blocks and at least one B block which is linked to at least two A blocks, at least one of said A blocks being a side-chain crystallizable polymeric block which has a crystalline melting point $T_g$ of 20° C. to 150° C. and comprises a plurality of repeating units derived from one or more monomers selected from the group consisting of linear aliphatic $C_{14-50}$ acrylates, linear aliphatic $C_{14-50}$ methacrylates, linear aliphatic $C_{6-50}$ fluoroacrylates, linear aliphatic $C_{14-50}$ acrylamides, linear aliphatic $C_{14-50}$ methacrylamides, linear aliphatic $C_{14-50}$ alkyl oxazolines, linear aliphatic $C_{14-50}$ vinyl ethers, linear aliphatic $C_{14-50}$ vinyl esters, linear aliphatic $C_{14-50}$ a-olefins, linear aliphatic $C_{14-50}$ 1,2-epoxides, and linear aliphatic $C_{14-50}$ alkyl glycidyl ethers, and said B block being selected from the group consisting of poly(vinyl ethers), polybutadienes, polyesters, polysiloxanes, polyethers, polyurethanes, and poly(butylacrylates) and having a glass transition point less than 0° C.

46. A thermoplastic elastomer comprising polymeric molecules comprising at least two A blocks and at least one B block, wherein at least one of said A blocks is a side-chain crystallizable polymeric block which has a crystalline melting point of about 60° to 110° C. and comprises a plurality of repeating units of the formula

wherein Y is a divalent radical which forms part of the backbone of the block, and Cy comprises a crystallizable moiety, at least some of the Cy radicals containing crystallizable moieties containing 30 to 50 carbon atoms, and said at least one B block is linked to at least two A blocks and is a polymeric block which has a glass transition temperature $T_g$ below about 0° C., which is amorphous at temperatures at which the thermoplastic elastomer exhibits elastomeric behavior, and which is selected from the group consisting of polyethers, polyacrylates, polyamides, polyurethanes and polysiloxanes.

47. A thermoplastic elastomer which is an (AB)$_n$ block copolymer where n is at least 2 and which comprises polymeric molecules comprising at least two A blocks and at least one B block, wherein at least one of said A blocks is a side-chain crystallizable polymeric block which has a crystalline melting point of about 0° to 200° C. and comprises a plurality of repeating units of the formula

wherein Y is a divalent radical which forms part of the backbone of the block and Cy comprises a crystallizable moiety, and said at least one B block is linked to at least two A blocks and is a polymeric block which has a glass transition temperature T$_g$ below about 0° C., which is amorphous at temperatures at which the thermoplastic elastomer exhibits elastomeric behavior, and which is selected from the group consisting of polyethers, polyacrylates, polyamides, polyurethanes and polysiloxanes.

48. A thermoplastic elastomer which is an ABA block copolymer and which comprises polymeric molecules comprising at least two A blocks and at least one B block, wherein at least one of said A blocks is a side-chain crystallizable polymeric block which has a crystalline melting point of about 0° to 200° C. and comprises a plurality of repeating units of the formula

wherein Y is a divalent radical which forms part of the backbone of the block and Cy comprises a crystallizable moiety, and said at least one B block is linked to at least two A blocks and is a polymeric block which has a glass transition temperature T$_g$ below about 0° C., which is amorphous at temperatures at which the thermoplastic elastomer exhibits elastomeric behavior, and which is selected from the group consisting of polyethers, polyacrylates, polyamides, polyurethanes and polysiloxanes.

49. A thermoplastic elastomer comprising polymeric molecules comprising at least two A blocks and at least one B block, wherein at least one of said A blocks is a side-chain crystallizable polymeric block which has a crystalline melting point of about 0° to 200° C. and comprises a plurality of repeating units of the formula

wherein Y is a divalent radical which forms part of the backbone of the block, and Cy comprises a crystallizable moiety which is linked to the —Y— radical through an amide, hydrocarbon, ether or ionic salt linkage, and said at least one B block is linked to at least two A blocks and is a polymeric block which has a glass transition temperature T$_g$ below about 0° C., which is amorphous at temperatures at which the thermoplastic elastomer exhibits elastomeric behavior, and which is selected from the group consisting of polyethers, polyacrylates, polyamides, polyurethanes and polysiloxanes.

50. A thermoplastic elastomer comprising polymeric molecules comprising at least two A blocks and at least one B block, wherein at least one of said A blocks is a side-chain crystallizable polymeric block which has a crystalline melting point of about 0° to 200° C. and comprises a plurality of repeating units derived from at least one monomer selected from the group consisting of linear aliphatic C$_{6-50}$ fluoroacrylates, linear aliphatic C$_{14-50}$ acrylamides, linear aliphatic C$_{14-50}$ methacrylamides, linear aliphatic C$_{14-50}$ alkyl oxazolines, linear aliphatic C$_{14-50}$ vinyl ethers, linear aliphatic C$_{14-50}$ vinyl esters, linear aliphatic C$_{14-50}$ a-olefins, linear aliphatic C$_{14-50}$ 1,2-epoxides and linear aliphatic C$_{14-50}$ alkyl glycidyl ethers, and having the formula

wherein Y is a divalent radical which forms part of the backbone of the block, and Cy comprises a crystallizable moiety, and said at least one B block is linked to at least two A blocks and is a polymeric block which has a glass transition temperature T$_g$ below about 0° C. and which is amorphous at temperatures at which the thermoplastic elastomer exhibits elastomeric behavior.

51. A thermoplastic elastomer comprising polymeric molecules comprising at least two A blocks and at least one B block, wherein at least one of said A blocks is a side-chain crystallizable polymeric block which has a crystalline melting point of about 0° to 200° C. and comprises (a) a plurality of repeating units of the formula

wherein Y is a divalent radical which forms part of the backbone of the block, and Cy comprises a crystallizable moiety, and (b) at least one other repeating unit, and said at least one B block is linked to at least two A blocks and is a polymeric block which has a glass transition temperature T$_g$ below about 0° C., which is amorphous at temperatures at which the thermoplastic elastomer exhibits elastomeric behavior, and which is selected from the group consisting of polyethers, polyacrylates, polyamides, polyurethanes and polysiloxanes.

52. A thermoplastic elastomer comprising polymeric molecules comprising at least two A blocks and at least one B block, wherein at least one of said A blocks is a side-chain crystallizable polymeric block which has a crystalline melting point of about 0° to 200° C. and comprises a plurality of repeating units of the formula

wherein Y is a divalent radical which forms part of the backbone of the block and which comprises a divalent ester, ether, or amide group, and Cy comprises a crystallizable moiety, and said at least one B block is linked to at least two A blocks and is a polymeric block which has a glass transition temperature T$_g$ below about 0° C., which is amorphous at temperatures at which the thermoplastic elastomer exhibits elastomeric behavior, and which is selected from the group consisting of polyethers, polyacrylates, polyamides, polyurethanes and polysiloxanes.

53. A thermoplastic elastomer (TPE) comprising polymeric molecules which comprise
 (i) polymeric A blocks in which there are side chains comprising crystallizable moieties having a melting point T$_q$, and (ii) at least one polymeric B block which is linked to at least two A blocks, which has a glass transition point, $T_{gs}$, which is less than $(T_q-10)°$ C., and which is amorphous at temperatures at which the thermoplastic elastomer exhibits elastomeric behavior, and which is selected from the group consisting of polyethers, polyacrylates, polyamides, polyurethanes and polysiloxanes;

at least one of the A blocks comprising a plurality of repeating units of the formula

wherein Y is a divalent radical which forms part of the backbone of the block, and Cy comprises a crystallizable moiety, and said TPE having at least one of the following characteristics:

(1) at least some of the Cy radicals contain crystallizable moieties containing 30 to 50 carbon atoms;

(2) it is an $(AB)_n$ block copolymer, where n is at least 2;

(3) the crystallizable moiety is linked to the —Y— radical through a carbonyl, amide, hydrocarbon, ether, or ionic salt linkage, (4) the A block comprises 60 to 100% by weight of units of the formula —Y(Cy)— and derived from at least one monomer selected from N-alkyl acrylamides, N-alkyl methacrylamides, alkyl oxazolines, alkyl vinyl esters, a-olefins, alkyl 1,2-epoxides and alkyl vinyl ethers in which the alkyl groups contain 14 to 50 carbon atoms;

(5) the block contains at least one other repeating unit in addition to the —Y(Cy)— repeating unit; and (6) Y comprises a divalent aromatic hydrocarbon, ester, ether, or amide group; and said TPE having been prepared by a process which comprises I. reacting together
   (i) an A block precursor which is the A block containing at least one reactive group J, and
   (ii) a B block precursor which is the B block containing at least two reactive groups K, which may be the same or different, which will react with the reactive group J or with a linking molecule which will react with the group K and the group J, to form a link which is part of the polymer backbone, the molar ratio of (i) to (ii) being at least 2, thus making a TPE of the ABA, $A_nB$, or $(AB)_n$ type where n is at least 2;

or

II. reacting together
   (i) a B block precursor which is the B block containing at least two reactive groups L, which may be the same or different,
   (ii) (a) a monomeric component comprising at least one monomer which will react with the group L and with itself or with a reactive group resulting from reaction of the monomeric component with the B block precursor, to form the A block, or
   (b) an A block precursor which is the A block containing at least one reactive group M which will react with the group L to form the A block, thus making a TPE of the ABA or $A_nB$ type, where n is at least 2; or III. reacting together
   (i) an A block precursor which is the A block terminated by a reactive group N, and (ii) a monomeric component comprising at least one monomer which will react with the group N and with itself to form the B block with at least two A blocks pendant from the polymeric backbone of the soft block, thus making a TPE of the ABA, $A_nB$ or $(AB)_n$ type, where n is at least 2; or IV. performing a living polymerization in which the monomers for the A and B blocks are polymerized separately and sequentially, using an initiator so that the growing polymer chain has a terminal group which reacts with the monomer present at that time and in turn produces a reactive terminal group on the residue of the monomer which has reacted with the growing polymer chain, thus making a TPE of the ABA, $A_nB$ or $(AB)_n$ type, where n is at least 2.

54. A composition, shaped article or assembly which comprises (1) a solid thermoplastic elastomer (TPE) comprising polymeric molecules which comprise
   (i) polymeric A blocks in which there are side chains comprising crystallizable moieties having a melting point $T_q°$ C., and
   (ii) at least one amorphous polymeric B block which is linked to at least two A blocks, which has a glass transition point, $T_{gs}$, which is less than $(T_q-10)°$ C., which is amorphous at temperatures at which the thermoplastic elastomer exhibits elastomeric behavior, and which is selected from the group consisting of polyethers, polyacrylates, polyamides, polyurethanes and polysiloxanes;

and (2) a second component which is a solid and is associated with the TPE;

said TPE being present in amount at least 10% by weight, based on the weight of the TPE and the second component.

55. A composition, article or assembly according to claim 54 wherein the second component is a thermally responsive material which undergoes a thermally induced change at a temperature $T_{crit}$ which is at least $(T_q+5)°$ C.

56. A composition, article or assembly according to claim 55 wherein $T_{crit}$ is between $(T_q+10)°$ C. and $(T_q+60)°$ C.

57. A composition according to claim 56 wherein the thermally responsive material is a solid energetic material which is dispersed in the TPE.

58. A composition according to claim 54 wherein the TPE is an ABA block copolymer.

59. A process for making a shaped article comprising a solid thermoplastic elastomer (TPE) comprising polymeric molecules which comprise (i) polymeric A blocks in which there are side chains comprising crystallizable moieties having a melting point $T_q$, and (ii) at least one polymeric B block which is linked to at least two A blocks, which has a glass transition point, $T_{gs}$, which is less than $(T_q-10)°$ C., which is amorphous at temperatures at which the thermoplastic elastomer exhibits elastomeric behavior, and which is selected from the group consisting of polyethers, polyacrylates, polyamides, polyurethanes and polysiloxanes:

which process comprises:

(A) melting the TPE, (B) dispersing a second solid component in the molten TPE, the amount of the TPE being at least 10% by weight, based on the weight of the TPE and the second component, (C) shaping the dispersion from step B, and (D) cooling the shaped article from step C to a temperature below $T_q$.

60. A process according to claim 59 wherein the second component is a thermally responsive material which undergoes a thermally induced change at a temperature $T_{crit}$ which is at least $(T_q+5)°$ C., and the molten TPE is at a temperature below $T_{crit}$ when the second component is dispersed therein.

61. A process according to claim 60 wherein $T_{crit}$ is between $(T_q+10)°$ C. and $(T_q+60)°$ C., and the molten TPE is at a temperature less than $(T_{crit}-15)°$ C. when the second component is dispersed therein.

62. A composition, article or assembly which comprises (1) a solid thermoplastic elastomer (TPE) comprising polymeric molecules which comprise (i) polymeric A blocks in which there are side chains comprising crystallizable moieties having a melting point $T_q°$ C., and (ii) at least one amorphous polymeric B block which is linked to at least two A blocks, which has a glass transition point, $T_{gs}$, which is less than $(T_q-10)°$ C., which is amorphous at temperatures at which the thermoplastic elastomer exhibits elastomeric behavior and which is selected from the group consisting of polyethers, polyacrylates, polyamides, polyurethanes and polysiloxanes;

and (2) a second component which is a solid and is associated with the TPE;

wherein said TPE is present in amount at least 10% by weight, based on the weight of the TPE and the second component and wherein at least one of the A blocks in the TPE comprises a plurality of repeating units of the formula

wherein Y is a divalent radical which forms part of the backbone of the block, and Cy comprises a crystallizable moiety, the TPE having at least one of the following characteristics:

(1) at least some of the Cy radicals contain crystallizable moieties containing 30 to 50 carbon atoms;

(2) it is an $(AB)_n$ block copolymer, where n is at least 2;

(3) the crystallizable moiety is linked to the —Y— radical through a carbonyl, amide, hydrocarbon, ether, or ionic salt linkage, (4) the A block comprises 60 to 100% by weight of traits of the formula —Y(Cy)— and derived from at least one monomer selected from N-alkyl acrylamides, N-alkyl methacrylamides, alkyl oxazolines, alkyl vinyl esters, a-olefins, alkyl 1,2-epoxides and alkyl vinyl ethers in which the alkyl groups contain 14 to 50 carbon atoms, (5) the block contains at least one other repeating unit in addition to the —Y(Cy)— repeating unit; and (6) Y comprises a divalent aromatic hydrocarbon, ester, ether, or amide group.

63. A thermoplastic elastomer (TPE) comprising polymeric molecules which comprise (i) polymeric A blocks in which there are side chains comprising crystallizable moieties having a melting point $T_q$, and (ii) at least one polymeric B block which is (a) linked to at least two A blocks, (b) has a glass transition point, $T_{gs}$, which is less than $(T_q-10)°$ C., (c) is amorphous at temperatures at which the thermoplastic elastomer exhibits elastomeric behavior, and (d) is selected from the group consisting of polyethers, polyacrylates, polyamides, polyurethanes, and polysiloxanes.

64. A thermoplastic elastomer (TPE) comprising polymeric molecules which comprise (i) polymeric A blocks in which there are side chains comprising crystallizable moieties having a melting point $T_g$, and (ii) at least one polymeric B block which is (a) linked to at least two A blocks, (b) has a glass transition point, $T_{gs}$, which is less than $(T_q-10)°$ C., (c) is amorphous at temperatures at which the thermoplastic elastomer exhibits elastomeric behavior, and (d) comprises units derived from at least one alkyl acrylate, alkyl methacrylate, alkyl acrylamide or alkyl methacrylamide.

65. A TPE according to claim 64 wherein each of the B blocks contains, in addition to the units derived from at least one alkyl acrylate, alkyl methacrylate, alkyl acrylamide or alkyl methacrylamide, units derived from acrylic acid, methacrylic acid, acrylamide, methacrylamide, acrylonitrile, acrolein, styrene or a vinyl ester.

* * * * *